United States Patent [19]
Leftwich et al.

[11] Patent Number: 5,249,277
[45] Date of Patent: Sep. 28, 1993

[54] OPTIMIZED PERFORMANCE MEMORY METHOD AND SYSTEM

[75] Inventors: James H. Leftwich, Austin; Gregory D. Roberts, Georgetown; James M. O'Quinn, Austin, all of Tex.

[73] Assignee: Compuadd Corporation, Austin, Tex.

[21] Appl. No.: 564,431

[22] Filed: Aug. 8, 1990

[51] Int. Cl.⁵ .............................................. G06F 12/02
[52] U.S. Cl. ........................... 395/400; 364/DIG. 1;
364/243; 364/245; 364/245.2; 364/245.31;
364/246; 364/246.3
[58] Field of Search .................. 395/425, 400;
365/230.01, 230.03; 364/200 MS File, 900 MS File

[56] References Cited
U.S. PATENT DOCUMENTS

| | | | |
|---|---|---|---|
| 4,747,070 | 5/1988 | Trottier et al. | 395/165 |
| 4,950,620 | 8/1990 | Harrington, III | 437/60 |
| 4,951,248 | 8/1990 | Lynch | 364/900 |
| 5,109,521 | 4/1992 | Culley | 395/800 |

OTHER PUBLICATIONS

Mirecki, Ted, *Speed Infusion (Part II) (Hardware Review)*, PC Tech Journal, vol. 5, No. 4, pp. 66–74, Apr. 1987.

Primary Examiner—Rebecca L. Rudolph
Attorney, Agent, or Firm—Baker & Botts

[57] ABSTRACT

A system and method for optimizing the performance of a computer memory system substitutes faster memory for a certain portion of the main memory. The substituted memory section automatically assumes a predesignated portion of the main memory and allows the main memory to become sequentially reorganized. Using this arrangement, for example, all the DOS applications that reside in the first 640 Kbytes of memory can be resident in the faster memory and the original main memory can then be used for other applications.

19 Claims, 19 Drawing Sheets

OPTIMIZED PERFORMANCE MEMORY METHOD AND SYSTEM

TECHNICAL FIELD OF THE INVENTION

This invention relates to computer memory systems and more particularly to such a system which automatically adapts to the presence of additional fast performance memory.

BACKGROUND OF THE INVENTION

The IBM PC family is based on the 8088, 80286 and 80386 Intel processors. A popular operating system for these PC's is the disk operating system ("DOS"). This operating system and all the applications that run under it are stored in the first 640 kilobytes of random access memory ("RAM"). (DOS 4.01 and earlier).

In order to speed up performance of DOS and DOS applications, many computer designers have installed memory caches on their systems. These systems typically use a small high speed memory as the "cache". This technique increases memory access speed when the program is loaded into the cache. This solution partially fails, however, when the size of DOS and the DOS applications exceeds the size of the cache memory. The system is then forced to wait to address data in the slower speed memories. Another disadvantage of cache memory systems are DRAM refresh delays. These delays are created by the need to periodically refresh dynamic RAM's. Because the caches are small and cannot contain entire DOS and DOS application data, they must be linked with the DRAM's. The DRAM's often contain spillover data from the cache. The cache memory then is idle while the DRAM's are refreshed.

It is one objective of the present invention to optimize performance of the memory containing the DOS and DOS applications.

This is a second objective of this inventor to have a zero wait state during memory reads and writes.

It is a still further objective of this inventor to avoid overhead involved in maintaining the slower dynamic random access memory ("DRAM") memory that contains the remaining system memory.

SUMMARY OF THE INVENTION

To achieve performance better than cache based systems, the first 640 kilobytes of memory are mapped to a high speed static random access memory ("SRAM") array. These addresses contain DOS and DOS applications. The most frequently accessed addresses are now within a high speed SRAM array. The array can achieve zero wait state reads and writes because of its high operating speed and static memory characteristics. There is no refresh overhead associated with the SRAM array. Because the array is large enough to contain all of DOS and of DOS applications, it may operate independently of the DRAM refresh cycle.

Therefore, it is a technical advantage of this invention that, when installed, a signal from the invention is passed to the mother board telling it to sequentially map the first 640 kilobytes of memory to the card. The remaining memory is mapped sequentially to the cache and DRAM. When the card is removed, the absence of the signal tells the mother board to map all memory to the DRAM and cache system. It is a further technical advantage of this invention to provide high speed memory cells for the most frequently addressed data.

BRIEF DESCRIPTION OF THE DRAWINGS

The foregoing objects, features and technical advantages, as well as others, of the invention will be more apparent from the following description of the drawings in which:

FIGS. 3–7, 8a, 8b, 9a, 9b, 10a, 10b, 11a, 11b, 12, 13, 14a, 14b show a specific embodiment of the invention operating in conjunction with a computer system.

DETAILED DESCRIPTION OF THE INVENTION

Figure 1:
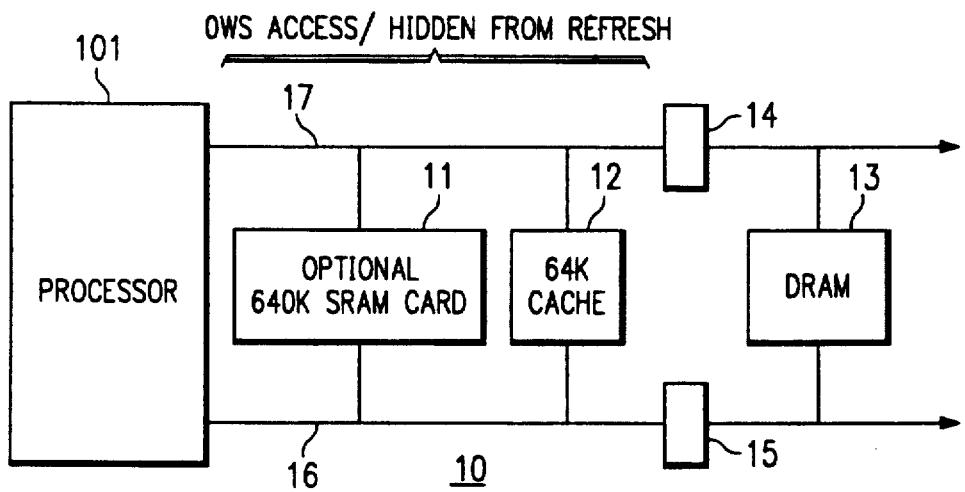
FIG. 1 shows a schematic representation of the host computer and of the fast performance memory.

FIG. 1 shows system 10 with address bus 17 and data bus 16. When SRAM 11 is not installed, processor 101 only uses cache memory 12 and DRAM 13 to store information. Individual memory cells in cache 12 and DRAM 13 are identified by processor 101 through address bus 17. The contents of individual cells in cache 12 and DRAM 13 are passed to and from processor 101 through data bus 16. Buffers 14 and 15 isolate the circuitry of DRAM 13 from processor 101 and from any other device connected to buses 16 and 17. Buffers 14 and 15 also latch highspeed signals on buses 14 and 15 for use by DRAM 13.

When SRAM card 11 is installed in system 10, processor 101 reads and writes data to SRAM 11, cache 12 and DRAM 13. SRAM card 11 is connected to buses 16 and 17. Neither SRAM 11 nor cache 12 needs to be refreshed by processor 101 and buffers 14 and 15 operate as if SRAM 11 was not present.

Figure 2:
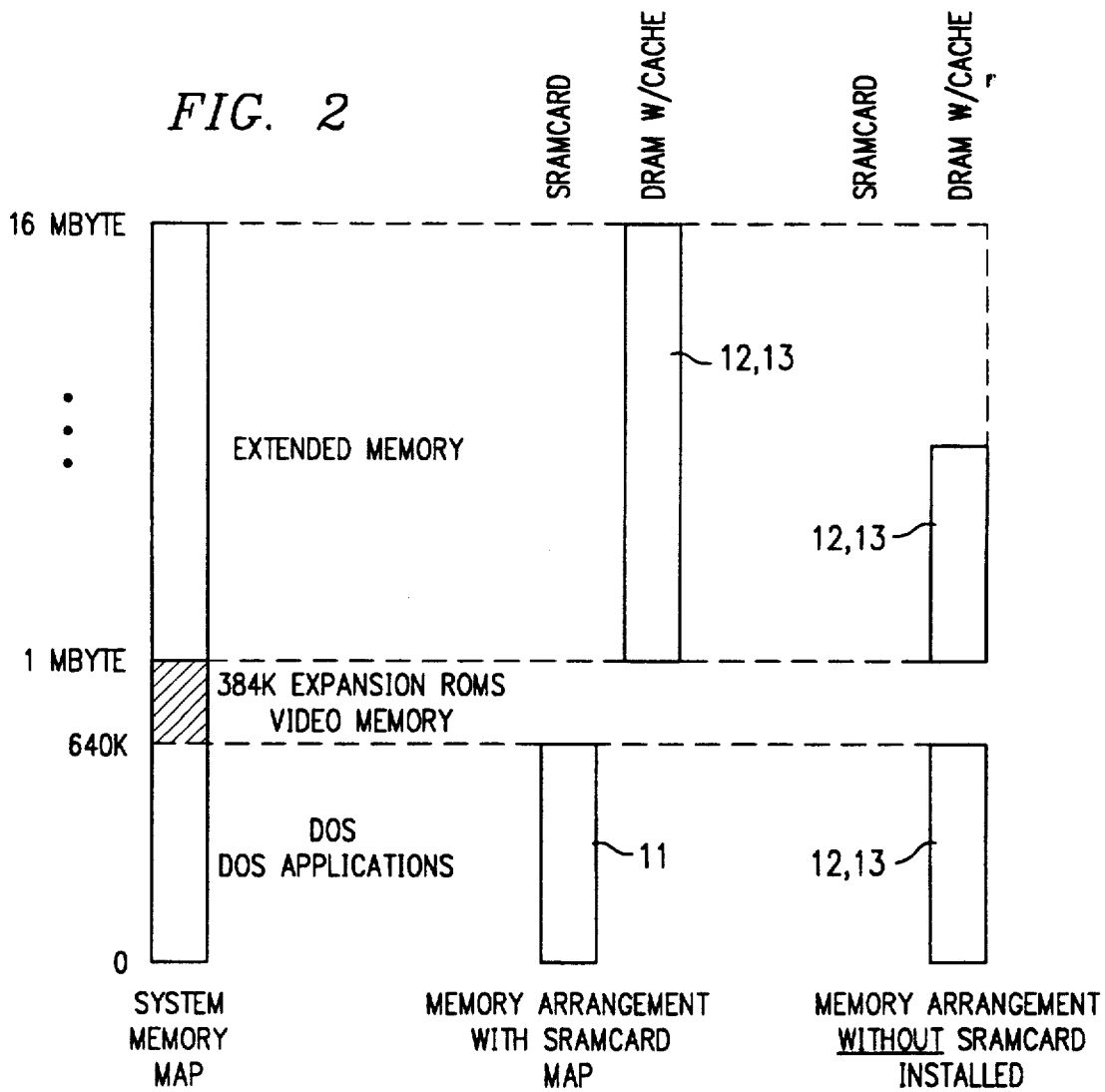
FIG. 2 illustrates the location of system memory with and without the SRAM card installed.

FIG. 2 depicts how system memory is allocated when SRAM card 11 is installed and when it is absent. When SRAM card 11 is not installed, processor 101 sequentially writes all data to the cache memory 12 and to DRAM 13. As shown, the address space is all within memory 12 and 13, sequentially.

When the SRAM card is installed, the first 640 kilobytes of system memory is written to the SRAM card and thus the first 640 kilobytes of memory 11 and 12 are shifted upward in sequence as shown. The memory cells of memory 11 then contain DOS and DOS application software. The original memory is then allocated to the cache memory and to the DRAM. In either case, provision for 384 kilobytes of video Read Only Memory ("ROM") is permanently located at the addresses immediately following the first 640 kilobytes of system memory.

FIGS. 3 through 13 show one embodiment of a circuit that performs the functions discussed above. This embodiment relies on a number of programmable logic array circuits (PALS), programming for which is shown in Appendix A.

Figure 3:
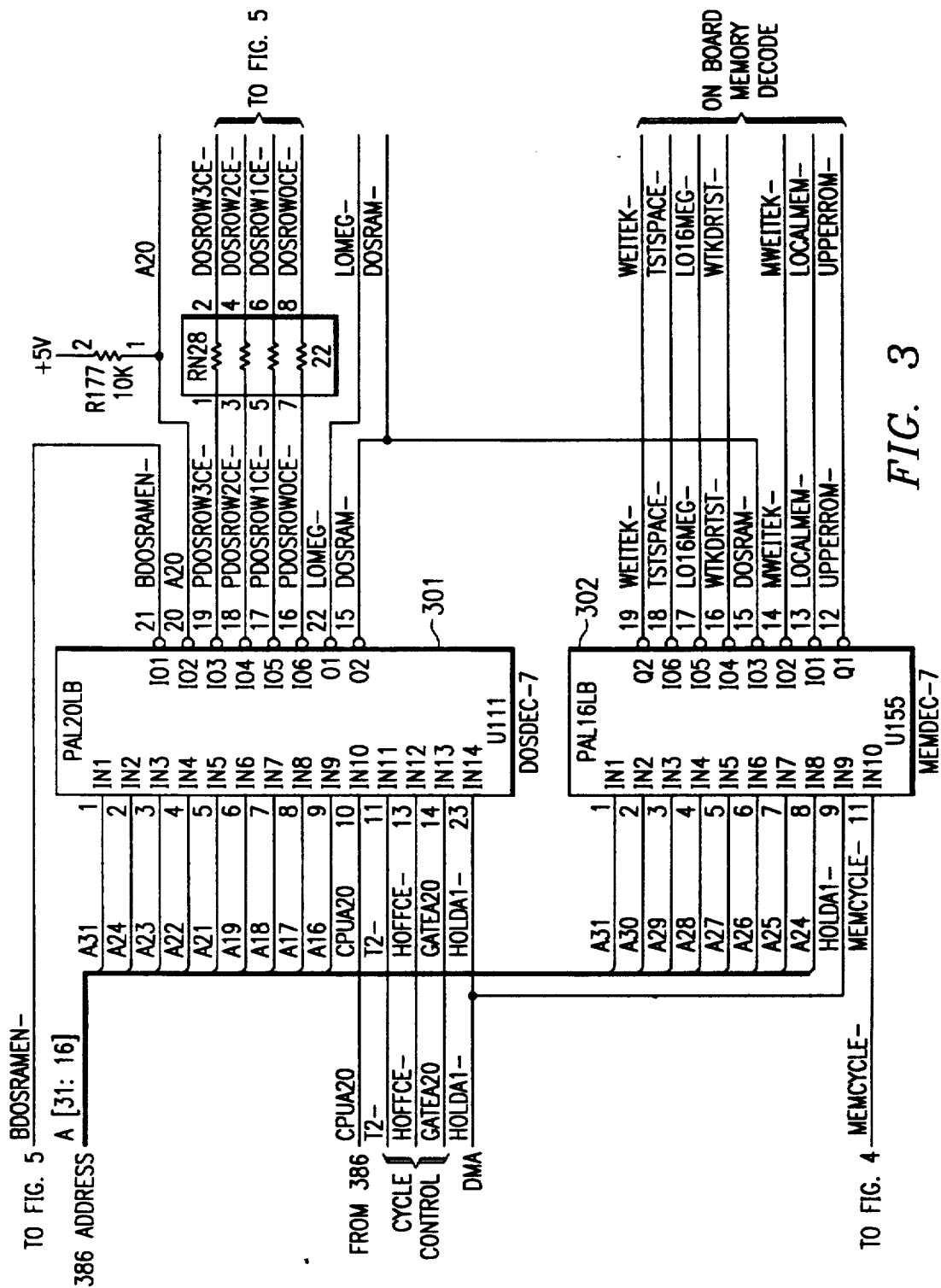

As shown on FIG. 3, the chip enables for the SRAMS on the SRAMCARD come out of DOSDEC pal. This pal decodes cycles to the SRAMCARD when it is installed, and asserts the proper chip enable. Only one chip enable is asserted at a time. The chip enables correspond to rows of SRAMS on the SRAMCARD. The exact definition is given below.

MEMDEC pal 302 decodes memory space for the motherboard. It also generates a signal which indicates to offsheet logic that the current cycle is to local memory.

Local memory is memory resources which are on the motherboard and have special interfaces. The SRAMCARD qualifies as local memory.

The following Signal Description section describes individual signals on the page.

|  | I = Input signal on this page<br>O = Output signal on this page<br>I/O = Input/Output signal on this page |  |
|---|---|---|
| A[31:16] | /I : | Addresses from the 386 chip, or from the DMA (direct memory access) logic. |
| CPUA20 | I : | Address from the 386 chip |
| GATEA20 | I : | Offsheet control which gates CPUA20 from the 386 |
| A20 | I/O : | Gated CPUA20 from the 386 |
| T2 | I : | Comes from offsheet control logic and indicates that a 386 cycle is currently active. |
| HOFFICE | I : | A control signal which holds the SRAMCARD chip enable signals active through the entire cycle. |
| HOLDA1- | I : | An offsheet signal indicates that a DMA cycle is active. |
| BDOSRAMEN- | I : | Comes from the SRAMCARD connector. When low this indicates that the SRAMCARD is installed. |
| LOMEG- | O : | Indicates cycle to memory below 1 megabyte. The SRAMCARD resides in this space when installed. |
| DOSRAM- | O : | Indicates that the current cycle decodes to the SRAMCARD. |
| PDOSROW0CE | O : | Chip enable for SRAM card row (0 to 256K) |
| PDOSROW1CE- | O : | Chip enable for SRAM card row (156K to 512K) |
| PDOSROW2CE- | O : | Chip enable for SRAM card row 2 (512K to 576K) |
| PDOSROW3CE- | O : | Chip enable for SRAM card row 3 (576K to 640K) |
| MEMCYCLE- | I : | Offsheet signal indicates current cycle is to a memory mapped device. |
| UPPERROM- | O : | Part of the BIOS rom decode |
| LOCALMEM- | O : | Indicates cycle is to local memory. The SRAMCARD is a local memory resource. |
| MWEITEK | O : | Indicates cycle is to the WEITEK coprocessor. |
| WTKORTST- | O : | Indicates cycle is to the WETIEK or test space |
| L016MEG | O : | Indicates current cycle is to the low 16 mBYTES |
| TSTSPACE- | O : | Indicates current cycle is to the testspace |

Figure 4:
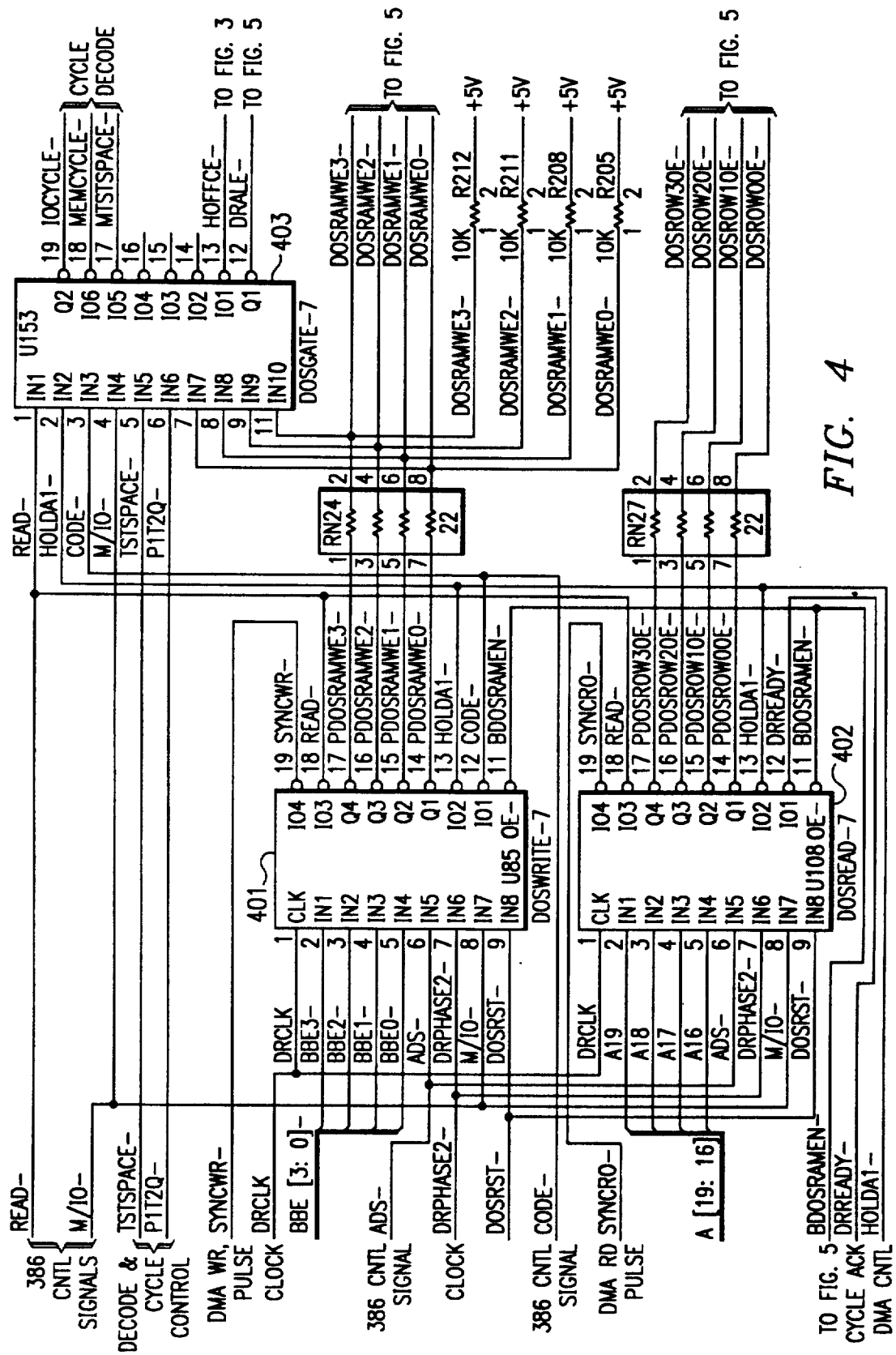

FIG. 4 shows logic which completes the control for the SRAMCARD. DOSGATE pal 403 controls the gating of addresses and chip enables to the card. DOSWRITE pal 401 controls the write strobes to the card. DOSREAD 402 pal controls the output enables to the card. The write strobes and the output enables connect directly to the SRAMS on the SRAMCARD.

| SIGNAL DESCRIPTIONS: | | |
|---|---|---|
| READ-, CODE-, M/IO- | I : | Signals from the 386 which indicate the type of cycle currently active |
| P1T2Q | I : | Like T2-, this signal indicates that a cycle from the 386 is |

| -continued | | |
|---|---|---|
| SIGNAL DESCRIPTIONS: | | |
|  |  | active |
| IOCYCLE- | O : | Indicates the 386 is performing a cycle to an IO mapped device. |
| MEMCYCLE- | O : | Indicates the 386 is performing a cycle to a memory mapped device. |
| MTSTSPACE- | O : | Decode of a memory mapped test space. |
| HOFFCE- | O : | Described above. |
| DRALE- | O : | Signal which gates addresses on the SRAMCARD. Used to hold addresses valid through the entire cycle. |
| DRCLK | I : | 66MHZ clk |
| BBE3- thru BBE0 | I : | signals indicate the BYTE currently being accessed. |
| ADS- | I : | Address strobe from the 386. Indicates the beginning of a cycle on its rising edge. |
| DRPHASE2- | I : | Generated by offsheet logic. Used to synchronize the motherboard with the 386. |
| DOSRST- | I : | Resets the PAL at power up time. |
| SYNCWR- | I : | Synchronized write pulse from offsheet DMA logic.<br>NOTE: The SRAMCARD will only be written to if the chip enable is active during the write strobe. |
| *PDOSRAMWE3- | O : | This signal is active on all memory writes where BBE3- is active (i.e. writes to byte 3). |
| *PDOSRAMWE2- | O : | This signal is active on all memory writes where BBE2 - is active (i.e. writes to byte 2). |
| *PDOSRAMWE1- | O : | This signal is active on all memory writes where BBE1- is active (i.e. writes to byte 1). |
| *PDOSRAMWE0- | O : | This signal is active on all memory writes where BBE0- is active (i.e. writes to byte 0). |
| A[19:16] | I : | Addresses from the 386 or DMA logic. Used to decode the proper rows on the SRAMCARD during a read to the SRAMCARD. |
| DRREADY- | I : | Indicates the end of a 386 cycle |
| SYNCRO | I : | Synchronized read pulse from offsheet DMA logic of the SRAMCARD. |
| *PDOSROW20E | O : | This signal is active during all reads to ROW2 of the SRAMCARD. |
| *PDOSROW10E | O : | This signal is active during all reads to ROW1 of the SRAMCARD. |
| *PDOSROW00E | O : | This signal is active during all reads to ROW0 of the SRAMCARD. |
| *PDOSROW300E | O : | This signal is active during all read to ROW3 of the SRAMCARD. |

Figure 5:
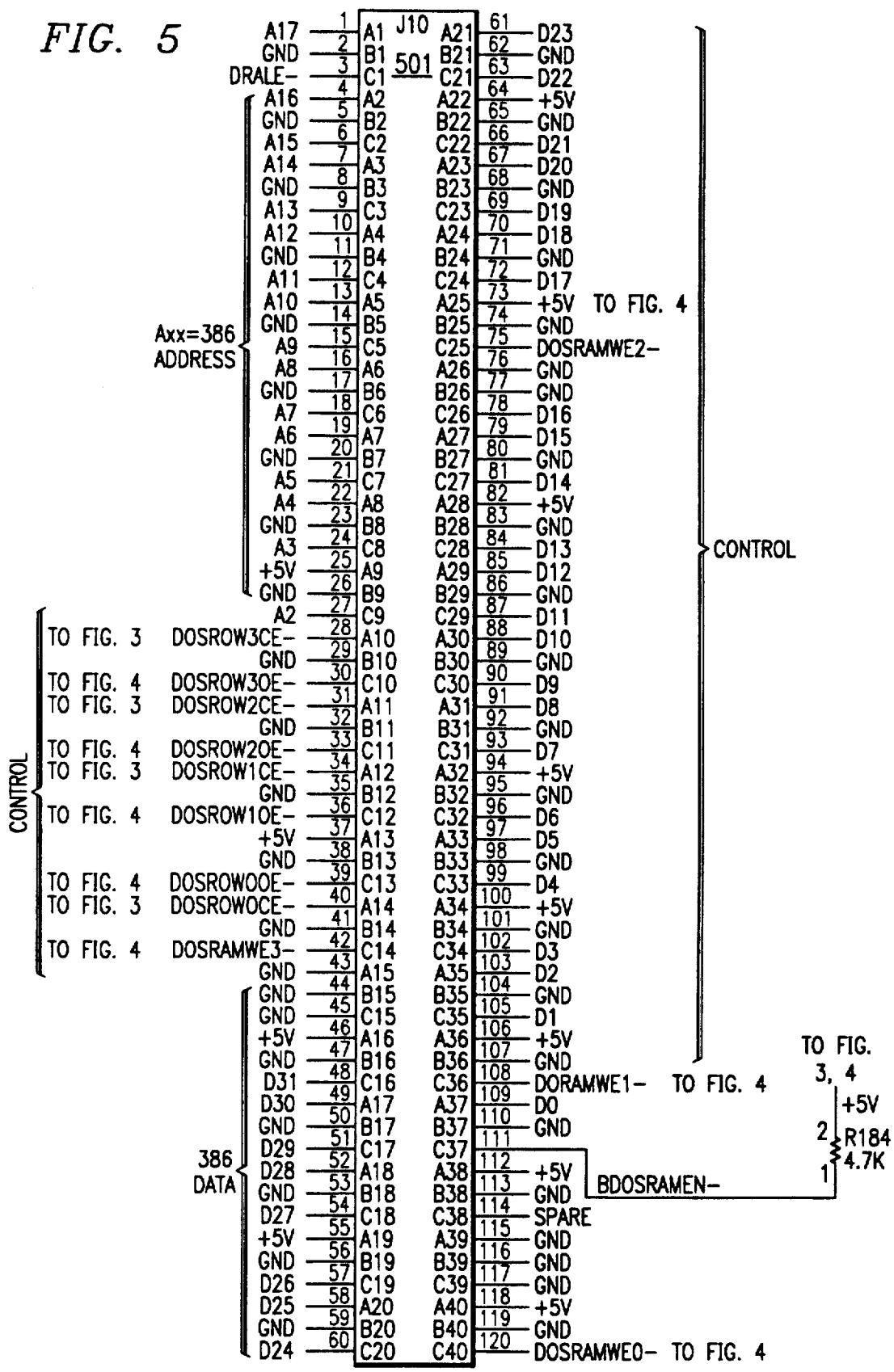

FIG. 5 shows the connector for the SRAMCARD on the mother board. All the control signals discussed above go to this connector. Address and data from the 386 and the DMA controller also go to this connector.

Figure 6:
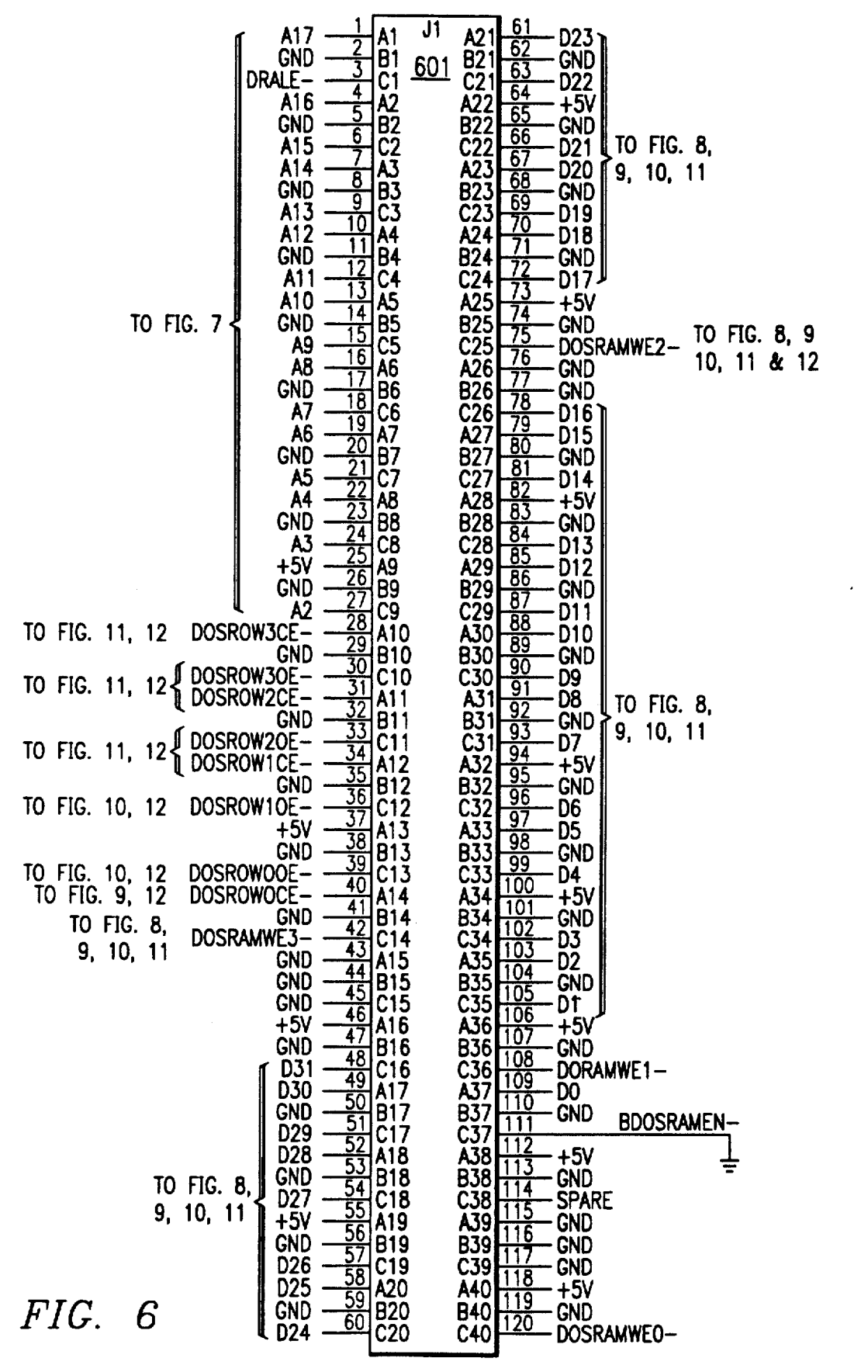

FIG. 6 shows the connector for the SRAMCARD on the card.

Figure 7:
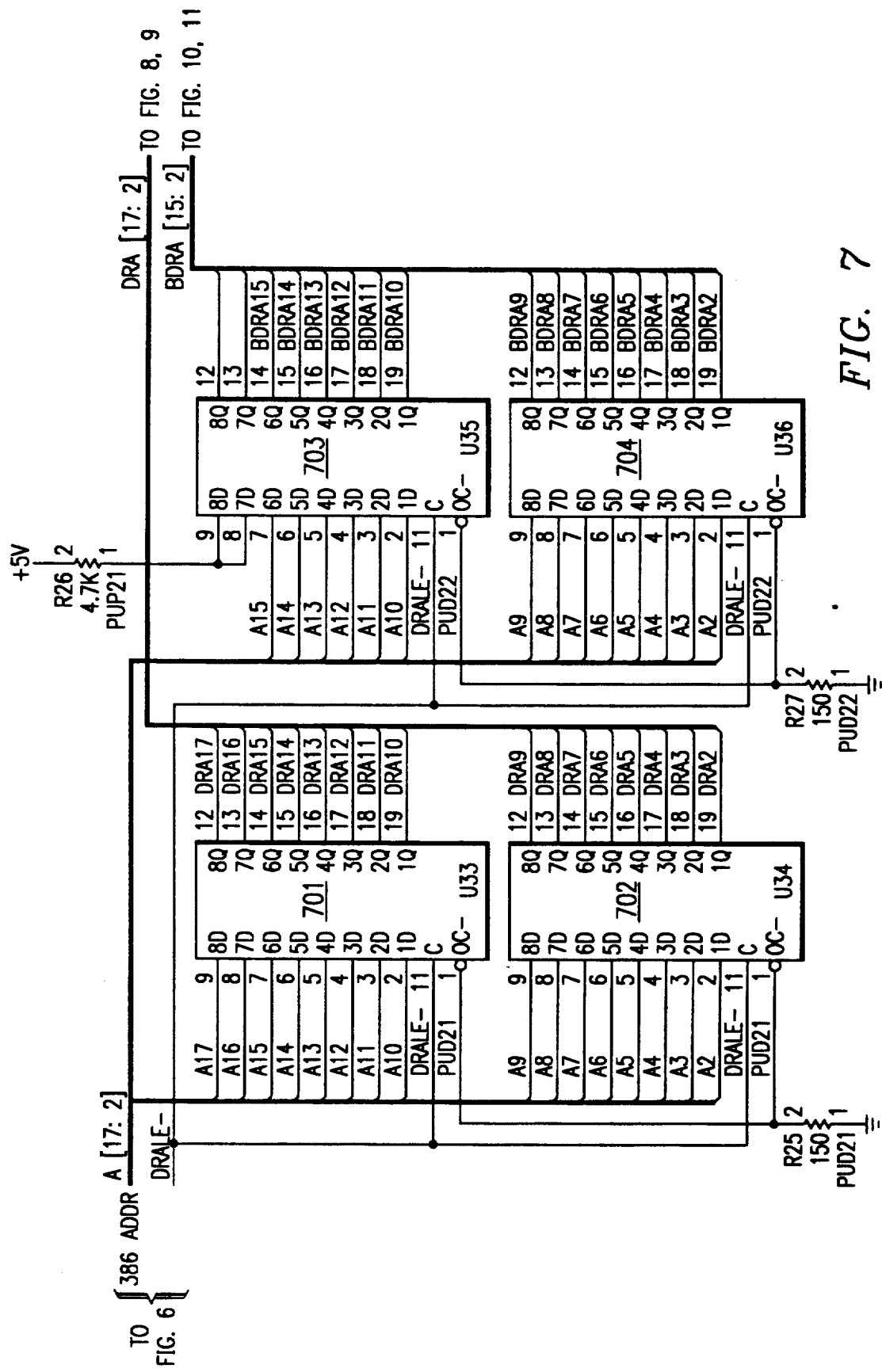
Figure 8A:
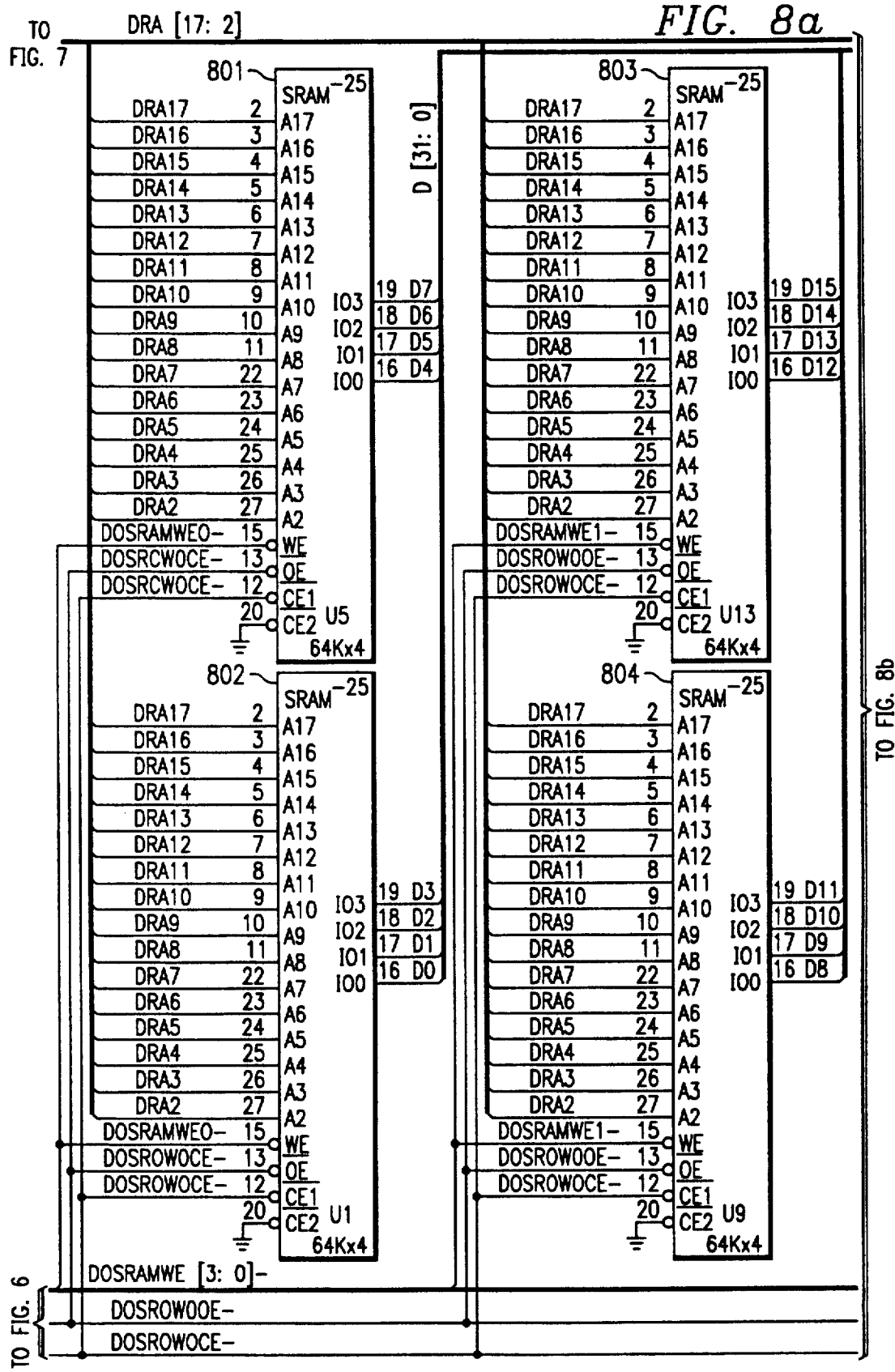
Figure 8B:
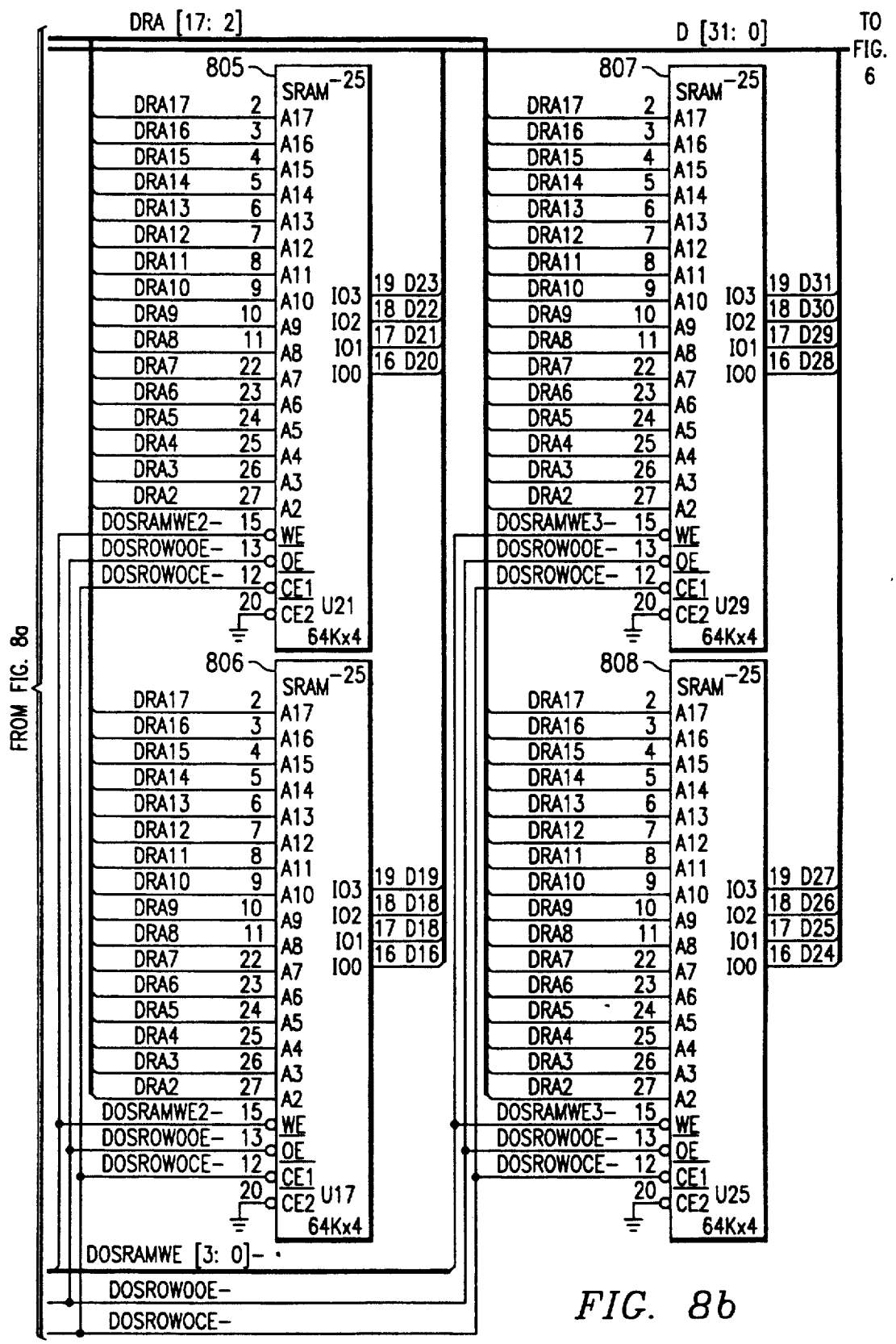
Figure 9A:
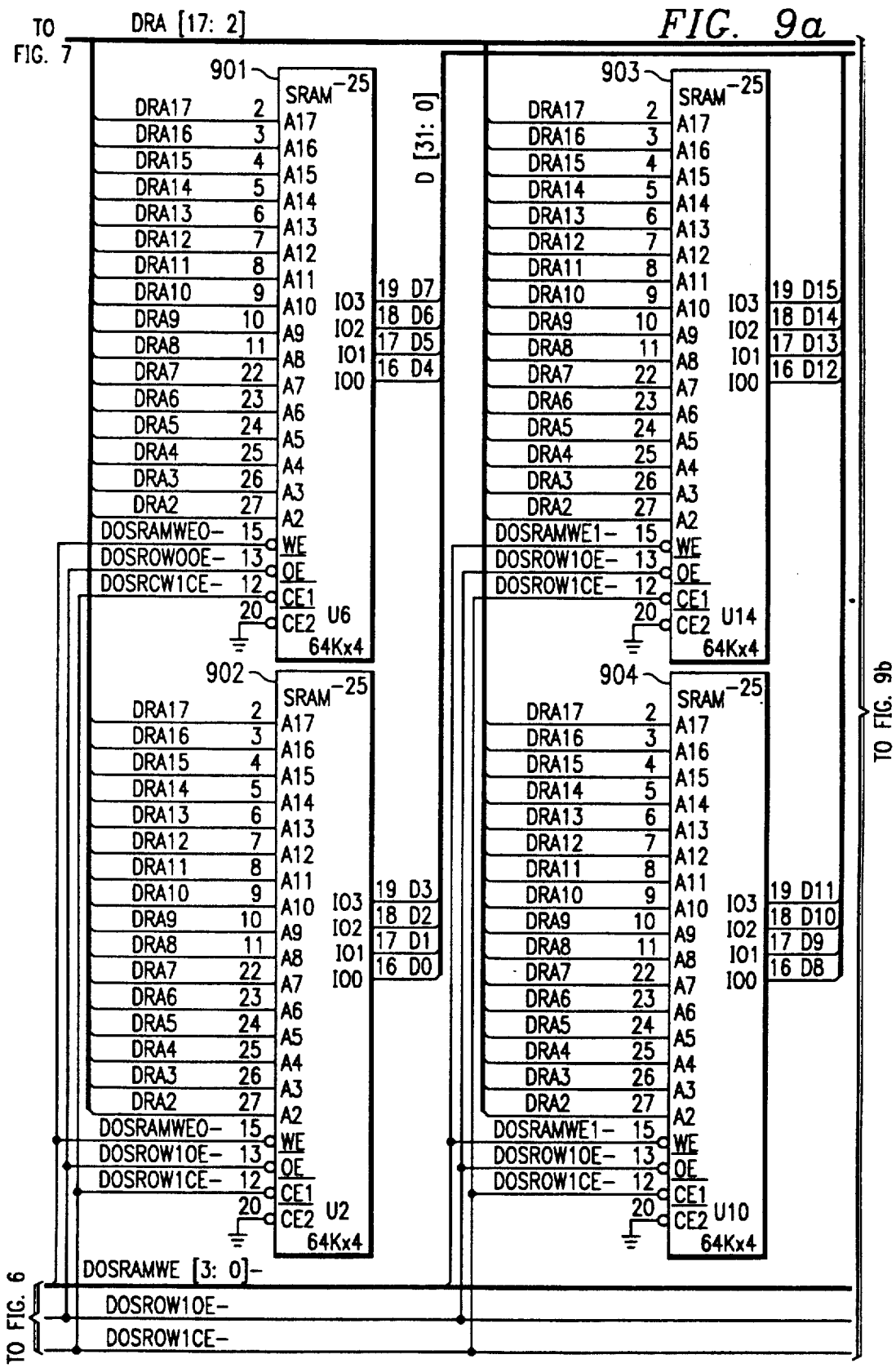
Figure 9B:
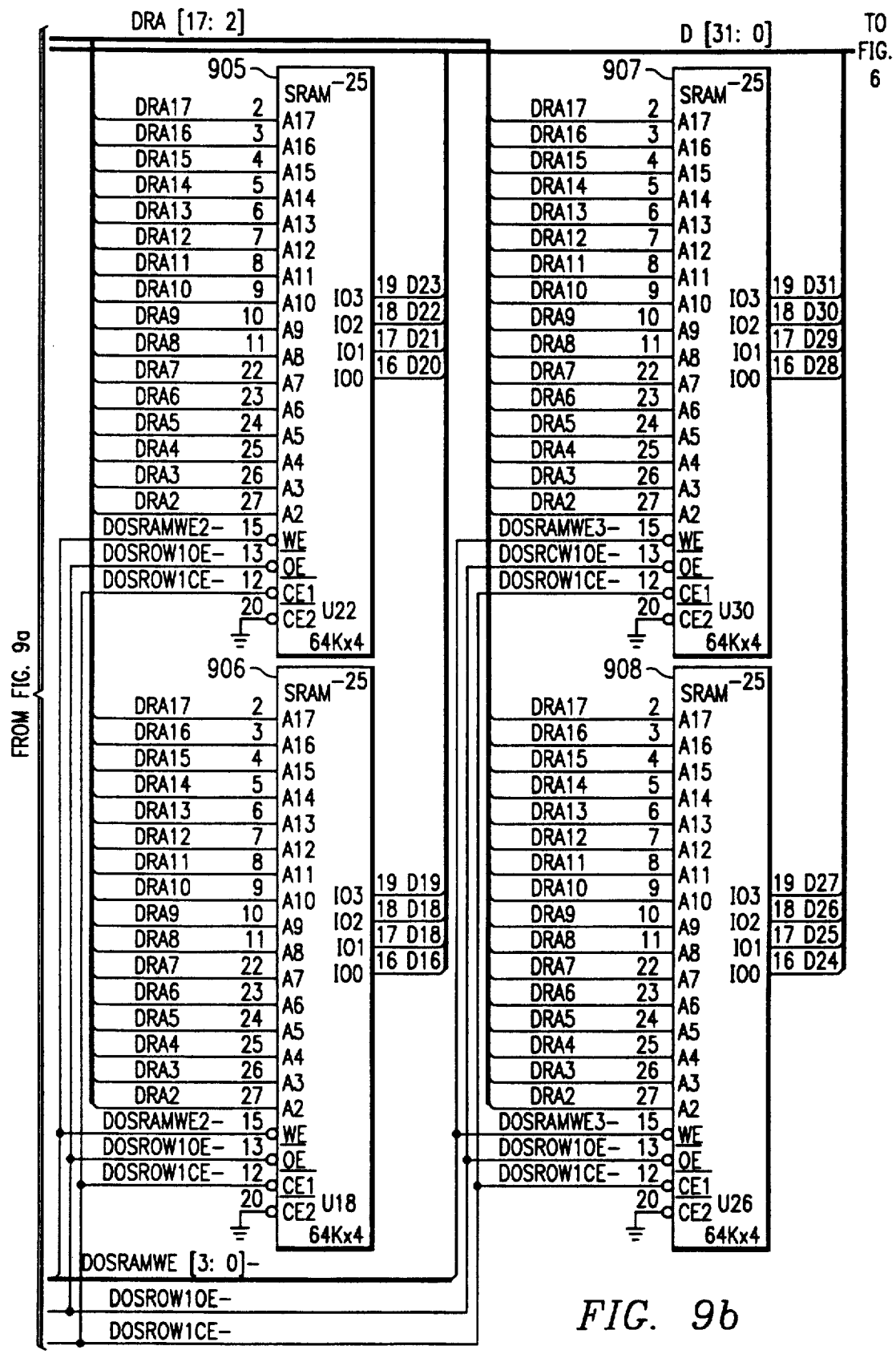
Figure 10A:
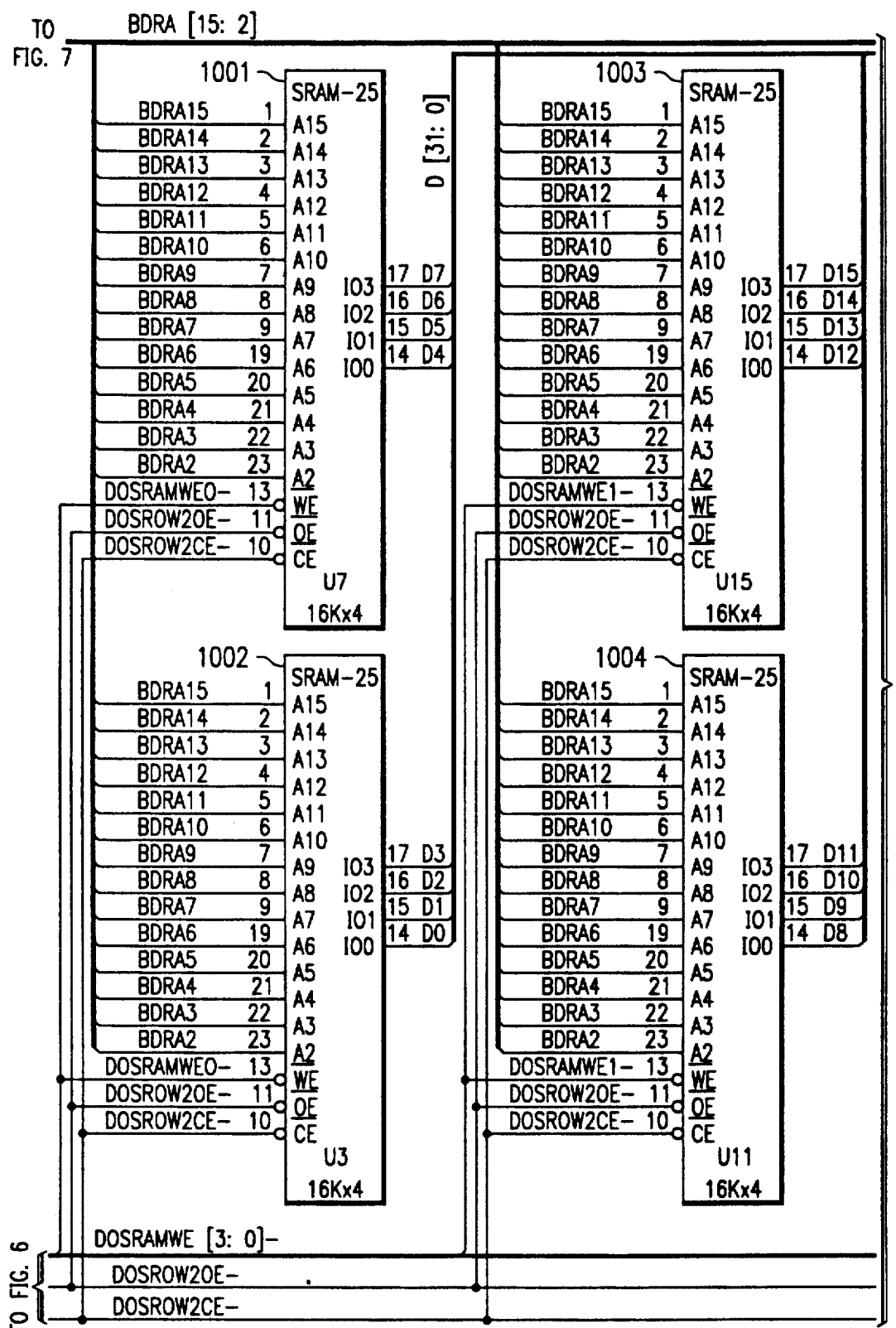
Figure 10B:
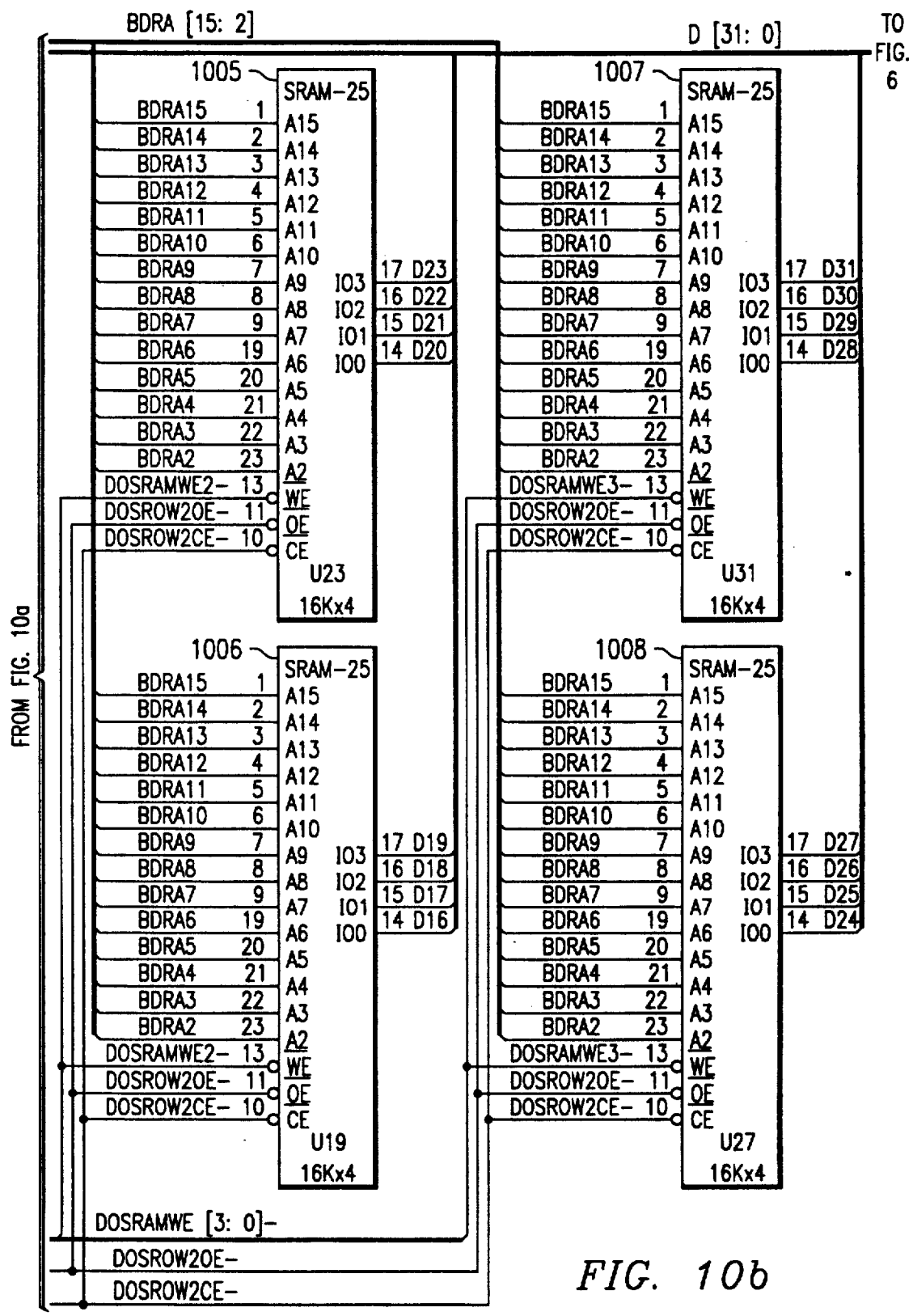
Figure 11A:
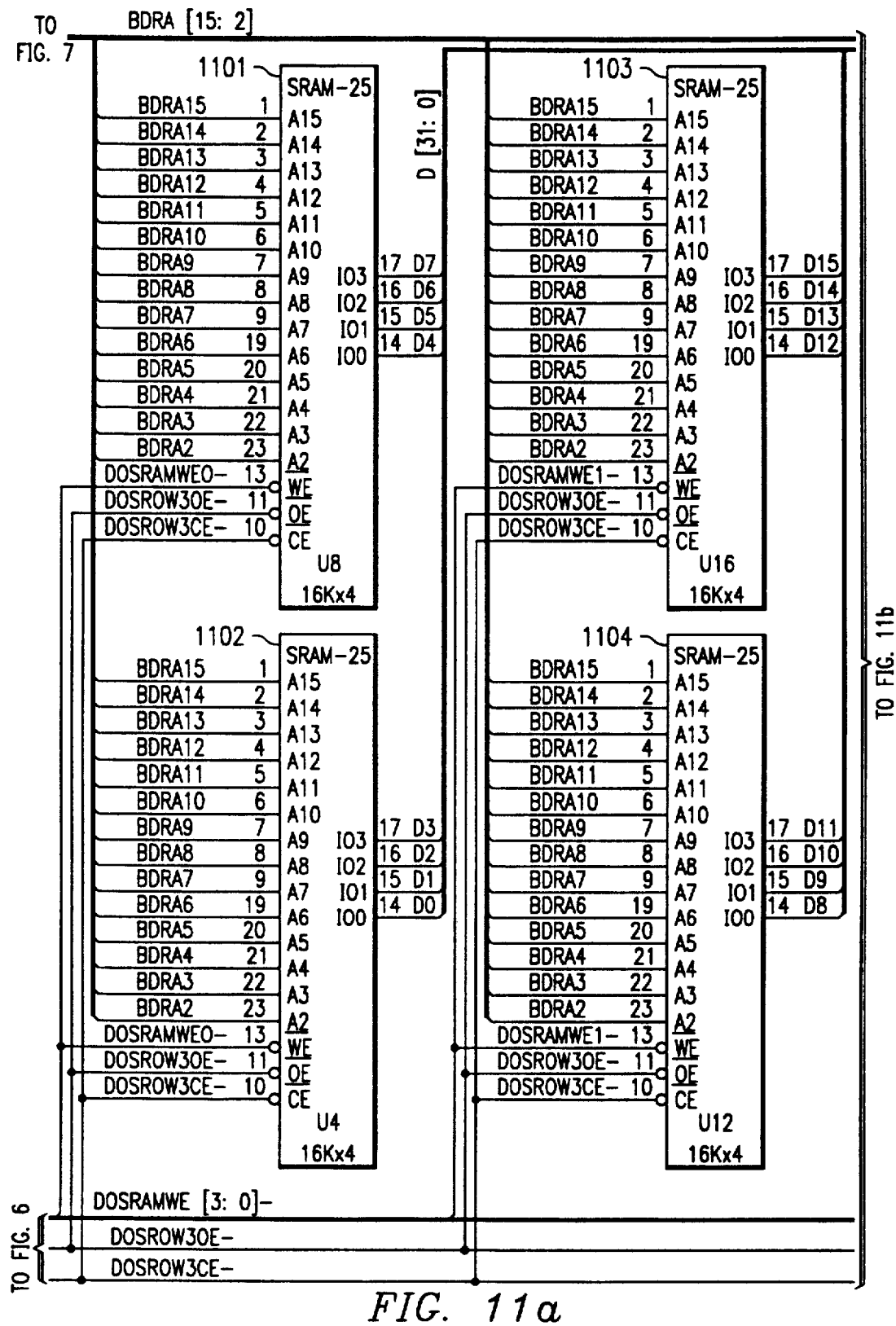
Figure 11B:
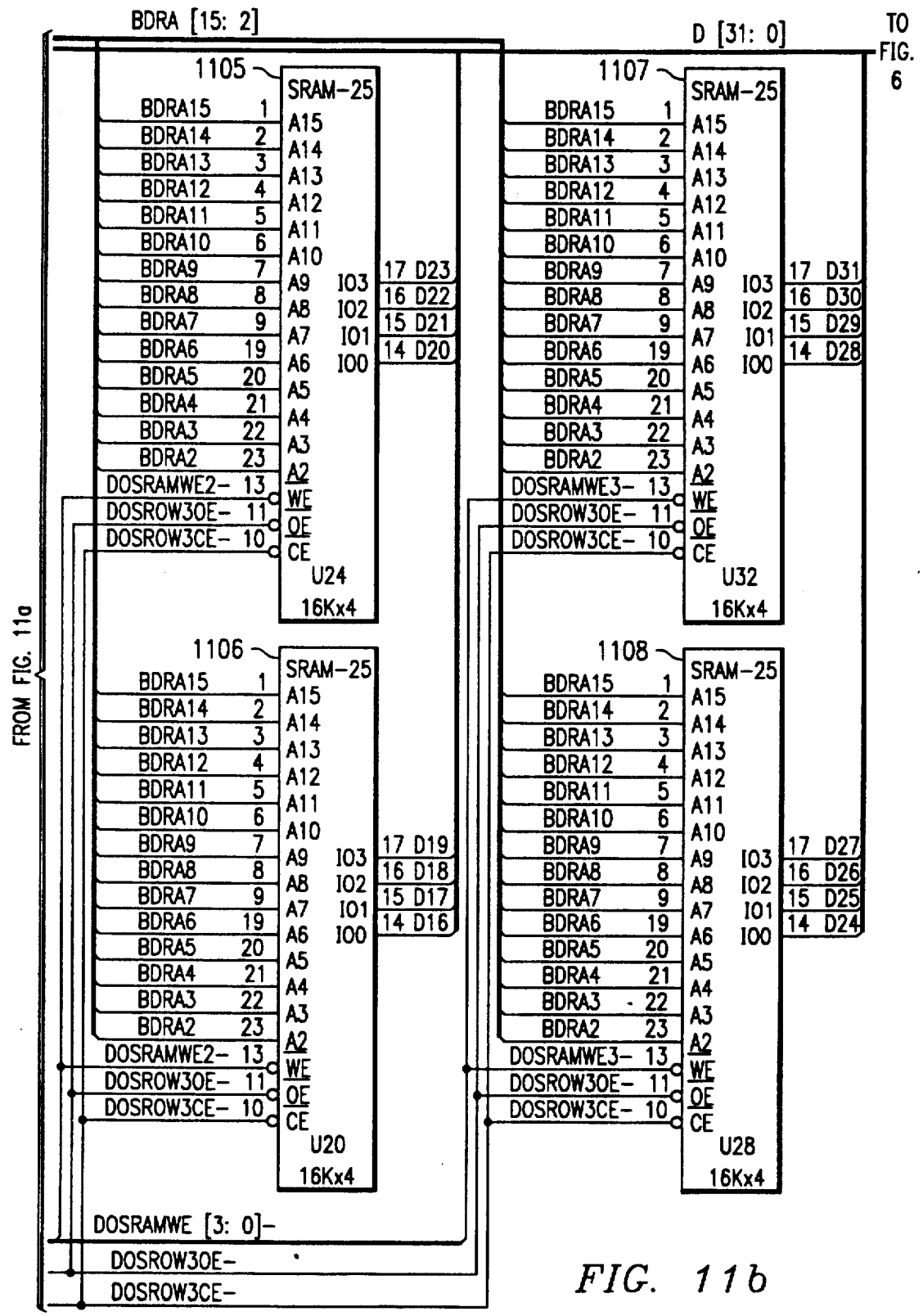

FIG. 7 shows the address latches for the SRAM on the SRAMCARD.

Figure 12:
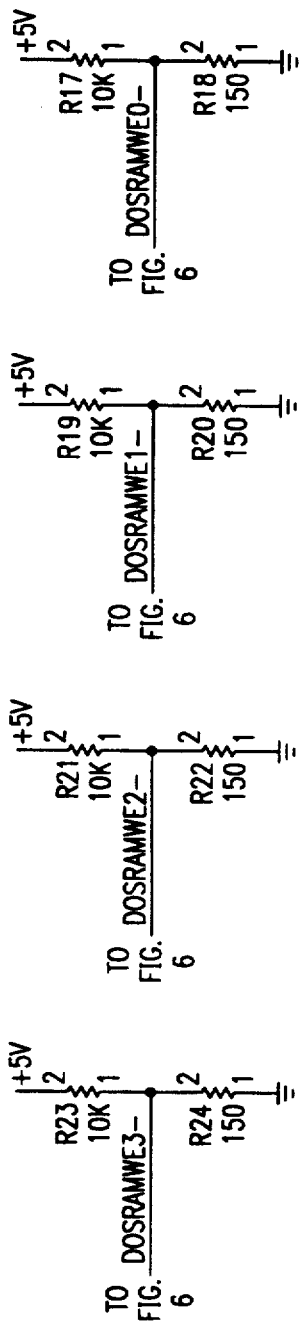
Figure 12:
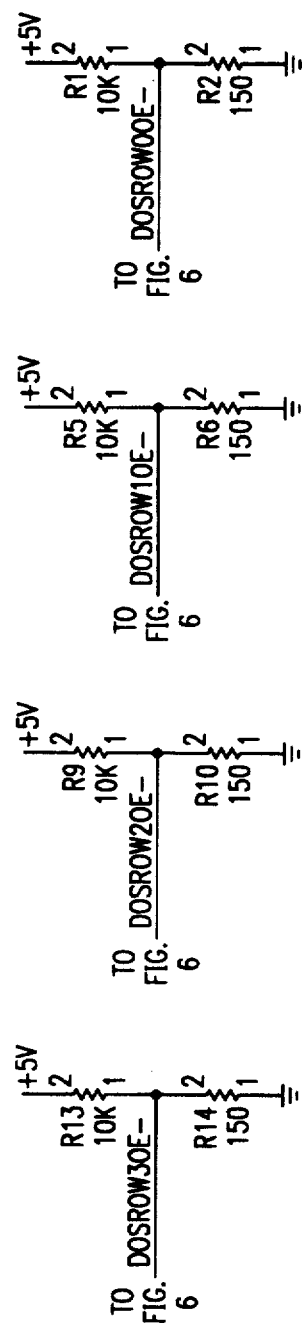
Figure 12:
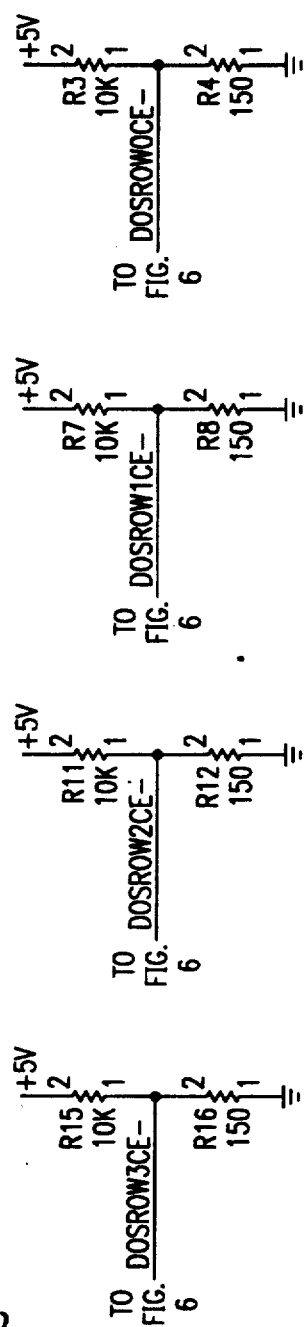

FIGS. 8-11 show the SRAM array and FIG. 12 shows the termination resistors for the control signals.

Figure 13:
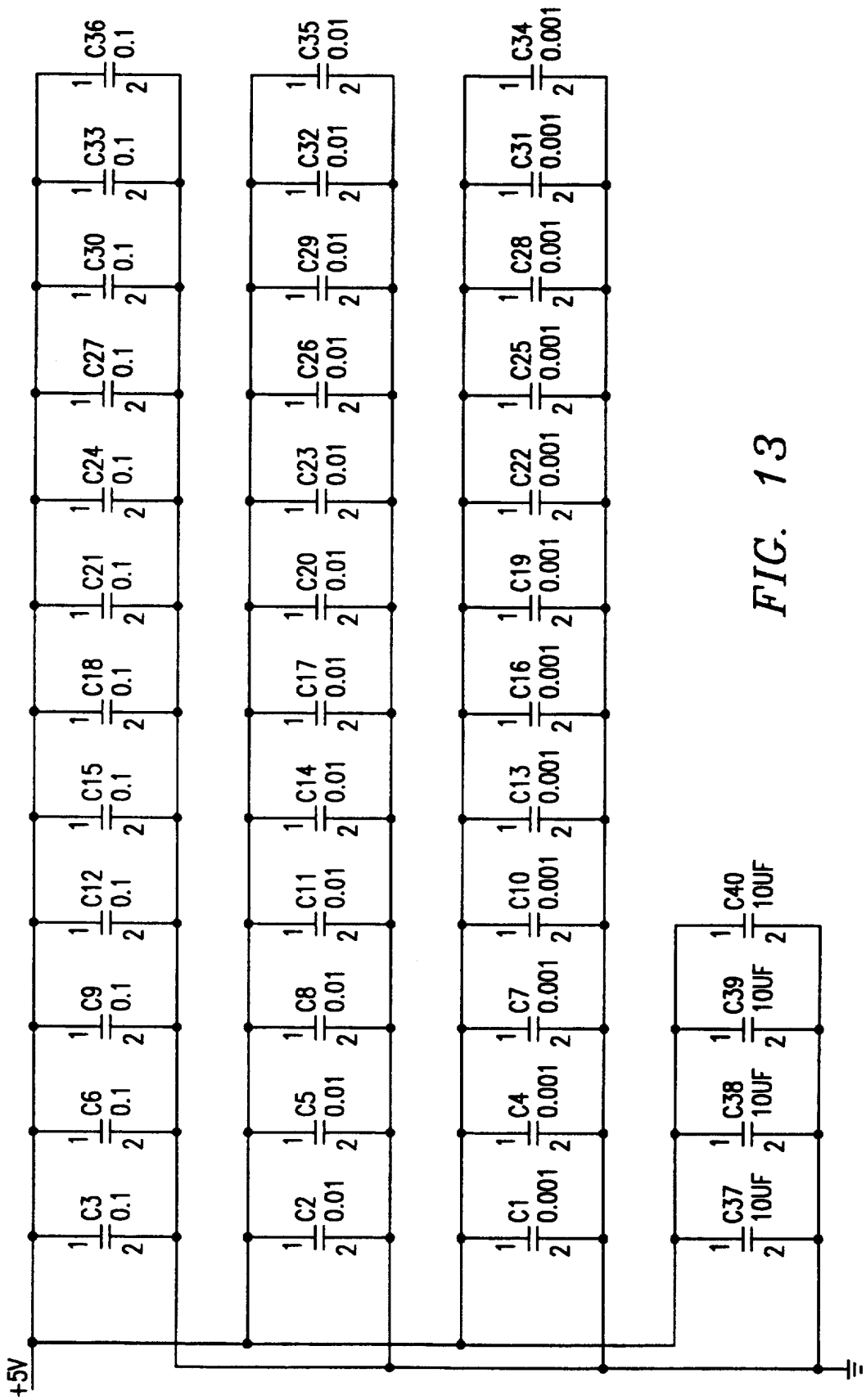

FIG. 13 shows bypass capacitors to reduce switching noise.

Figure 14A:
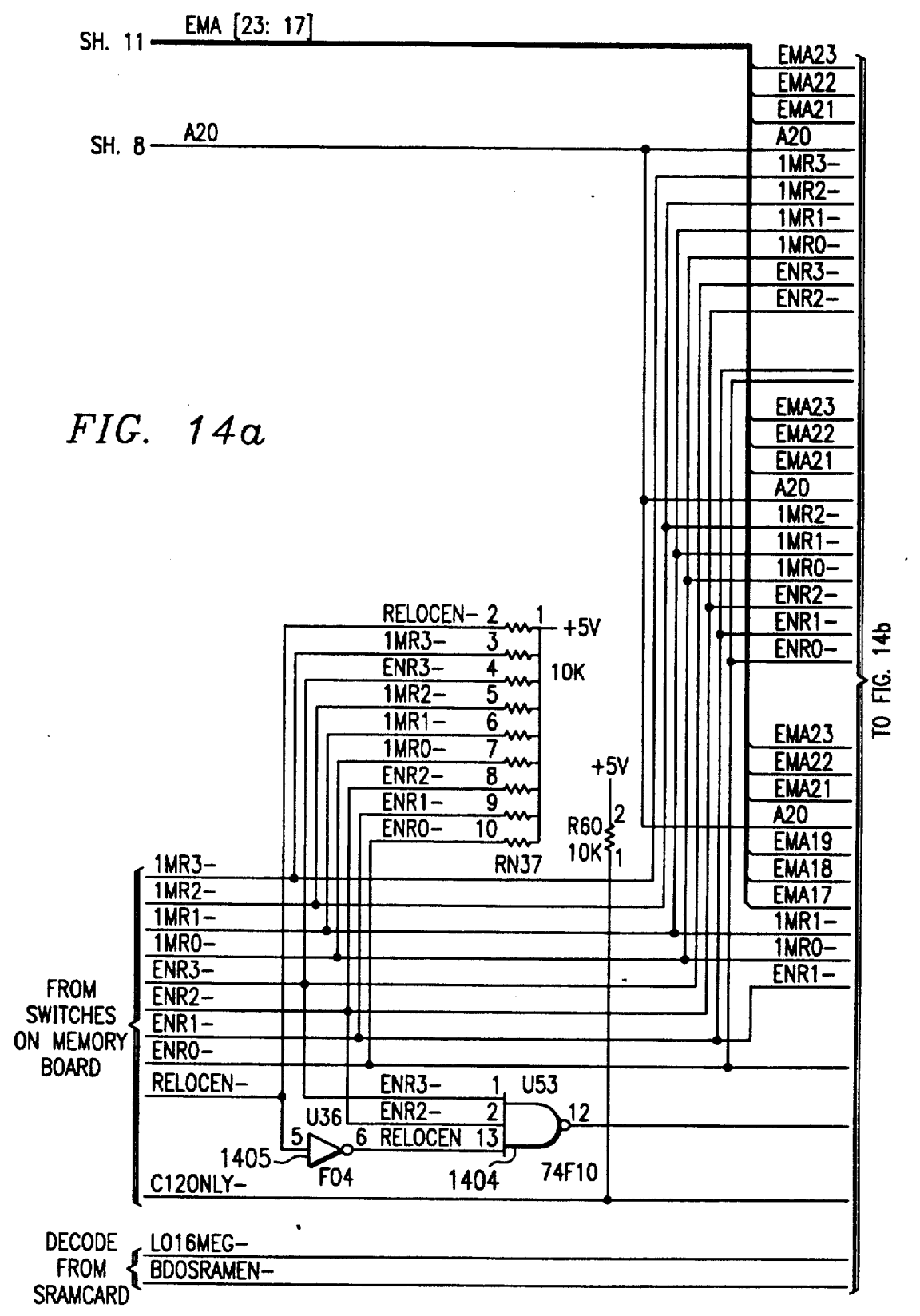
Figure 14B:
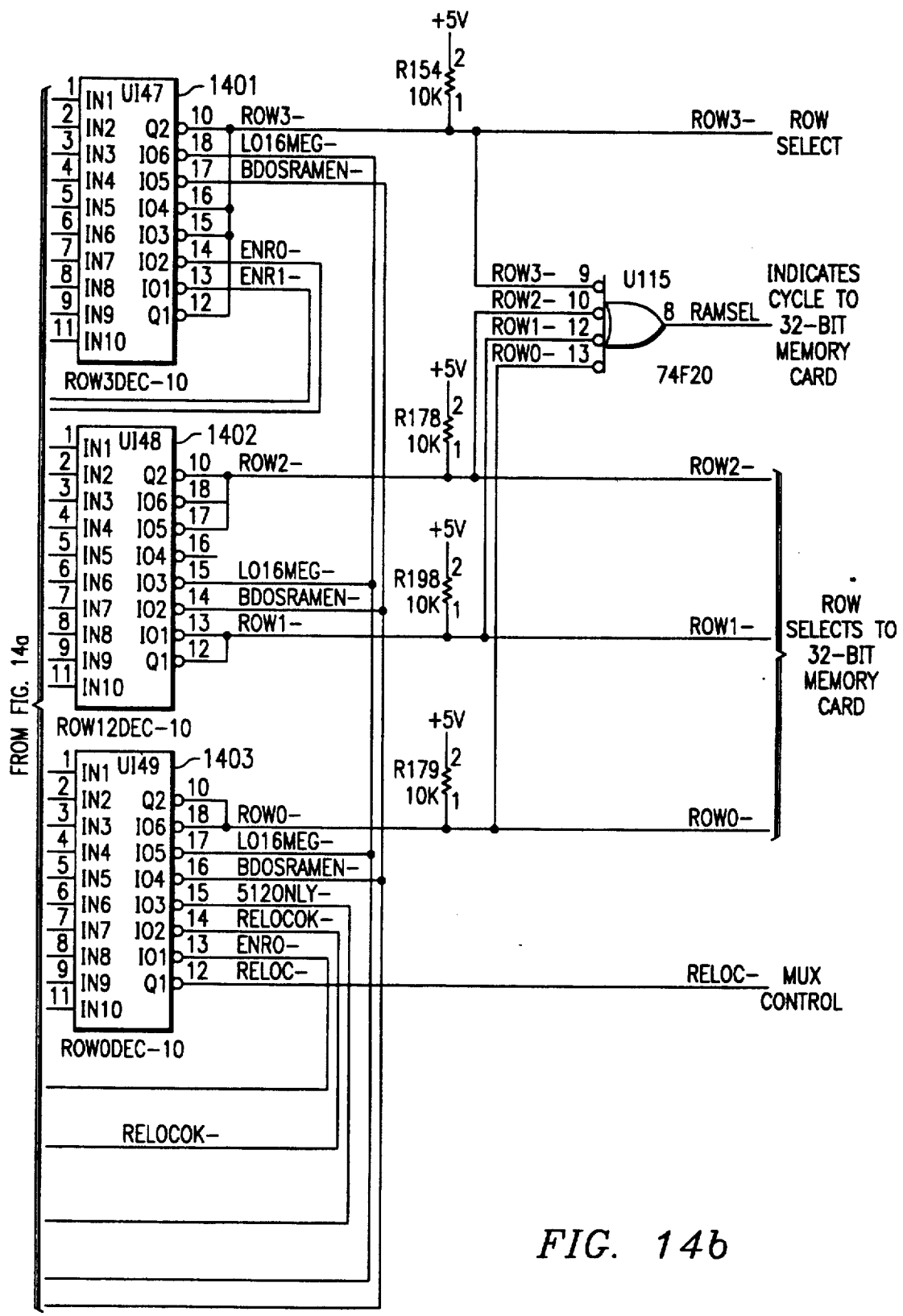
Figure 15:
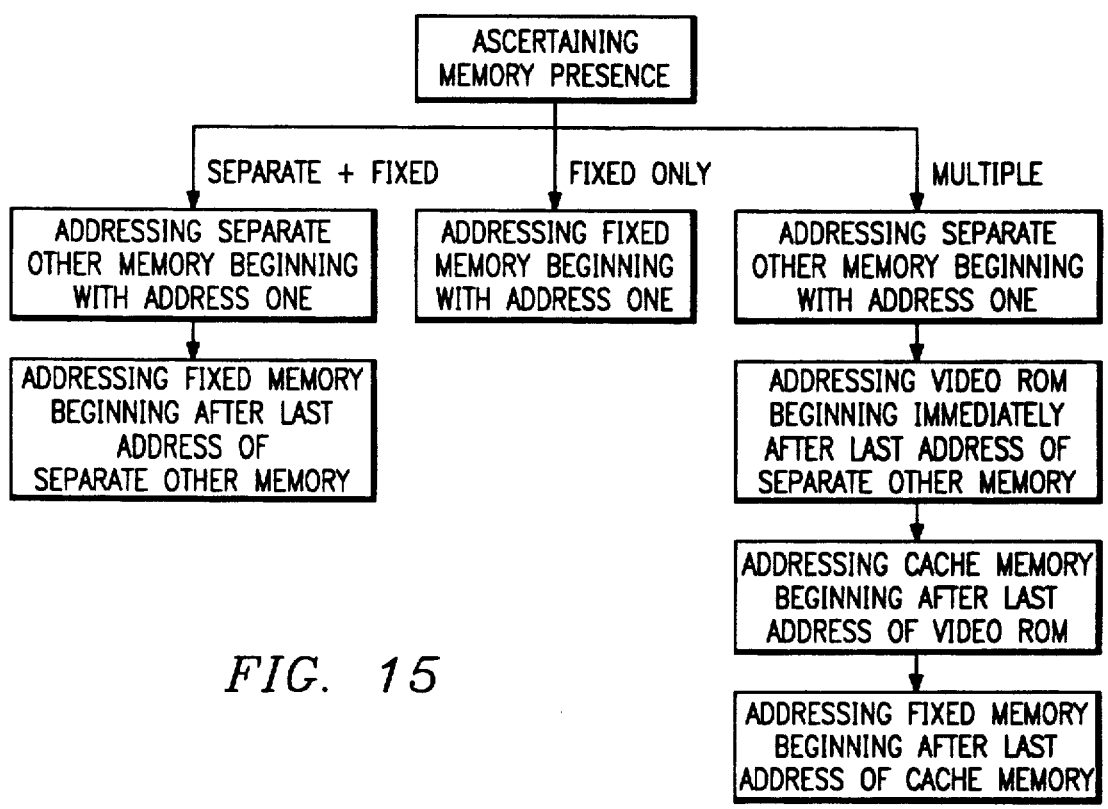
FIG. 15 illustrates a flowchart of the steps performed by a preferred embodiment of the invention.

FIG. 14 contains logic which decodes the cycles to the 32-Bit memory card. The three pals 1401, 402 and 403 use switches from the 32-Bit card, and the signal BDOSRAMEN- to determine where to locate the DRAMS in memory. If the SRAMCARD is installed, BDOSRAMEN- is active and the pals begin decoding the 32-BIT DRAM card at 1 MBYTE. If the SRAM-CARD is not installed, BDOSRAMEN- is inactive and the pals begin decoding the 32-BIT DRAM card at the bottom of memory space (address 0).

ROW3DEC pal decodes cycles to ROW 3 on the DRAMCARD. ROW12DEC pal decodes cycles to ROWs 1 and 2 on the DRAMCARD. ROW0DEC pal decodes cycles to ROW 0 on the DRAMCARD.

| | | Signal Description: |
|---|---|---|
| EMA[23:17] | I : | Latched addresses from the 386 or the DMA logic which are used by the decode pals to select the proper row. |
| RELOCEN- | I : | Switch setting which indicates whether relocation of the memory between 640K and 1 MBYTE is enabled. This feature is only available when the SRAMCARD is not installed. |
| 512 ONLY - | I : | Disables memory on the DRAMCARD between 512k and 1 MBYTE. This feature is only available when the SRAMCARD is not installed. |
| IMR3-, IMR2-, IMR1-, IMR0 | I : | Switches on the DRAMCARD which indicate whether 1MBYTE or 256K SIMMs are installed. |
| ENR3-, ENR2-, ENR1-, ENR0 | I : | Switches on the DRAMCARD which indicate which rows contain SIMMS. |
| * RAMSEL | I : | This is the logical OR of all the ROW selects. This signal indicates that the current cycle is going to the DRAMCARD. When the SRAMCARD is installed this signal will be active starting at 1MBYTE. When the SRAMCARD is not installed, this signal will be active starting at address 0. |

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A device for optimizing memory performance comprising:

a first memory storage unit operable for storing information at defined memory locations therein, said defined locations of said first memory storage unit being sequentially ordered;

a second memory storage unit also operable for storing information at defined memory locations therein, said defined locations of said second memory storage unit being sequentially ordered, said second memory storage unit having a faster operating speed than said first memory storage unit to optimize a specific operating system, said second memory storage unit generating a signal indicating its presence and availability; and means responsive to said signal for sequentially ordering said second memory storage unit prior to the sequential ordering of said first memory storage unit such that an operating system and operating system applications are stored within said second memory storage unit, wherein said second memory storage unit is sequentially ordered beginning with address number one.

2. The system of claim 1 wherein said first memory storage unit includes dynamic random access memories; and

Appendix A

PAC DOSDEC (301)

DESCRIPTION :

This pal generates the chip enables for the the DOSSRAM card:

```
ROW0 CE    0 - 256K
ROW1 CE    256K-512K
ROW2 CE    512K-576K
ROW3 CE    576K-640K
```

The Chip Enables latch with T2, and HOFFCE keeps them from changing at the end of a write. DOSRAM* indicates that the DOSSRAM card is installed, and the current address points to it. LOMEG* indicates that the current address resides in the low megabyte.

A31 A24 A23 A22 A21 A19 A18 A17 A16 CPUA20 /T2  GND
/HOFFCE GATEA20 /DOSRAM /PDR0CE /PDR1CE /PDR2CE /PDR3CE
A20 /DOSRAMEN /LOMEG /HOLDA1 VCC

EQUATIONS

```
A20.TRST = /HOLDA1
A20      = GATEA20*CPUA20              ; CPU
/A20     = /GATEA20
         + /CPUA20
```

DOSRAM

```
=   /HOLDA1*/A31*/A24*/A23*/A22*/A21*GATEA20*/CPUA20
    */A19*DOSRAMEN                       ; CPU 0-512K

+   /HOLDA1*/A31*/A24*/A23*/A22*/A21*/GATEA20
    */A19*DOSRAMEN                       ; CPU 0-512K

+   /HOLDA1*/A31*/A24*/A23*/A22*/A21*GATEA20*/CPUA20
    * A19*/A18*/A17*DOSRAMEN             ; CPU 512K-640K

+   /HOLDA1*/A31*/A24*/A23*/A22*/A21*/GATEA20
    * A19*/A18*/A17*DOSRAMEN             ; CPU 512K-640K

+   HOLDA1*/A23*/A22*/A21*/A20*/A19*DOSRAMEN ; DMA 0-512K

+   HOLDA1*/A23*/A22*/A21*/A20
    * A19*/A18*/A17*DOSRAMEN             ; DMA 512K-640K
```

LOMEG

```
=   /HOLDA1*/A31*/A24*/A23*/A22*/A21
    *GATEA20*/CPUA20                     ; CPU

+   /HOLDA1*/A31*/A24*/A23*/A22*/A21*/GATEA20 ; CPU

+   HOLDA1*/A23*/A22*/A21*/A20           ; DMA
```

PDR0CE

```
=   /HOLDA1*/A31*/A24*/A23*/A22*/A21
    *GATEA20*/CPUA20*/A19*/A18*/HOFFCE*DOSRAMEN
                                         ; CPU 000K-256K

+   /HOLDA1*/A31*/A24*/A23*/A22*/A21
    */GATEA20*/A19*/A18*/HOFFCE*DOSRAMEN ; CPU 000K-256K

+   HOLDA1*/A23*/A22*/A21*/A20
    */A19*/A18*DOSRAMEN                  ; DMA 000K-256K

+   PDR0CE*T2*DOSRAMEN                   ; HOLD
```

PDR1CE

```
= /HOLDA1*/A31*/A24*/A23*/A22*/A21
 *GATEA20*/CPUA20*/A19*A18*/HOFFCE*DOSRAMEN
                                                   ; CPU 256K-512K

+ /HOLDA1*/A31*/A24*/A23*/A22*/A21
  */GATEA20*/A19*A18*/HOFFCE*DOSRAMEN              ; CPU 256K-512K

+ HOLDA1*/A23*/A22*/A21*/A20
  */A19*A18*DOSRAMEN                               ; DMA 256K-512K

+ PDR1CE*T2*DOSRAMEN                               ; HOLD
```

PDR2CE

```
= /HOLDA1*/A31*/A24*/A23*/A22*/A21*GATEA20*/CPUA20
  *A19*/A18*/A17*/A16*/HOFFCE*DOSRAMEN             ; CPU 512K-576K

+ /HOLDA1*/A31*/A24*/A23*/A22*/A21
  */GATEA20*A19*/A18*/A17*/A16*/HOFFCE*DOSRAMEN
                                                   ; CPU 512K-576K

+ HOLDA1*/A23*/A22*/A21*/A20
  *A19*/A18*/A17*/A16*DOSRAMEN                     ; DMA 512K-576K

+ PDR2CE*T2*DOSRAMEN                               ; HOLD
```

PDR3CE

```
= /HOLDA1*/A31*/A24*/A23*/A22*/A21*GATEA20*/CPUA20
  *A19*/A18*/A17*A16*/HOFFCE*DOSRAMEN              ; CPU 576K-640K

+ /HOLDA1*/A31*/A24*/A23*/A22*/A21
  */GATEA20*A19*/A18*/A17*A16*/HOFFCE*DOSRAMEN
                                                   ; CPU 576K-640K

+ HOLDA1*/A23*/A22*/A21*/A20
  *A19*/A18*/A17*A16*DOSRAMEN                      ; DMA 576K-640K

+ PDR3CE*T2*DOSRAMEN                               ; HOLD
```

PAL MEMDEC (302)

DESCRIPTION:

This pal decodes the space for the WEITEK coprocessor if it is installed. LO16MEG is used to qualify decodes to the MEMORY card. TSTSPACE is used to access the SRAM in the cache logic through the memory space. UPPERROM decodes A[31:20] as all ones or all zeroes for the ROM decode out on the XA bus. LOCALMEM decodes all the resources not on the BUS or not on the MEMORY card.

*** LOCYC PAL AND RDYQUAL PAL REQUIRE MTSTSPACE AND
MWEITEK TO INCLUDE MEMCYCLE ***

A31 A30 A29 A28 A27 A26 A25 A24 /HOLDA1 GND
/MEMCYCLE /UPPERROM /LOCALMEM /MWEITEK /DOSRAM /WTKORTST
/LO16MEG /TSTSPACE /WEITEK VCC

EQUATIONS

WEITEK

= /HOLDA1*A31*A30*/A29*/A28*/A27*/A26*/A25        ; WEITEK

MWEITEK

= /HOLDA1*MEMCYCLE*A31*A30*/A29*/A28*/A27
  */A26*/A25                                      ; WEITEK

TSTSPACE

= /HOLDA1*/A31*/A30*/A29*/A28*/A27*/A26*/A25*A24
                                                  ; TST ACCESS

WTKORTST

= /HOLDA1*/A31*/A30*/A29*/A28*/A27*/A26*/A25*A24
                                                  ; TST ACCESS

+ /HOLDA1*A31*A30*/A29*/A28*/A27*/A26*/A25        ; WEITEK

LOCALMEM

= /HOLDA1*/A31*/A30*/A29*/A28*/A27*/A26*/A25*A24
                                                  ; TST ACCESS

+ /HOLDA1*MEMCYCLE*A31*A30*/A29*/A28
  */A27*/A26*/A25                                 ; WEITEK

+ /HOLDA1*MEMCYCLE*DOSRAM                         ; DOSSRAM CARD

LO16MEG

= /HOLDA1*/A31*/A30*/A29*/A28*/A27*/A26
  */A25*/A24                                      ; CPU

+ HOLDA1                                          ; DMA

UPPERROM

= /HOLDA1*A31*A30*A29*A28*A27*A26*A25*A24         ; FFXXXXXX

+ /HOLDA1*/A31*/A30*/A29*/A28*/A27*/A26
  */A25*/A24                                      ; 00XXXXXX

PAL DOSWRITE (401)

DESCRIPTION:

This pal generates the write strobes to the DOSSRAM CARD. The write strobes are qualified by the byte enable bits. The proper row to write on the DOSSRAM card is selected by the Chip Enables. During a hold, the Byte Enables are generated in the BYTEGEN pal using XBHE, XA1, and XA0. SYCWR is a one phase long pulse generated in the DMASYNC PAL.

```
DRCLK /BBE3 /BBE2 /BBE1 /BBE0 /ADS /DRPHASE2 /MIO /DOSRST
GND/BDOSRAMEN /CODE /HOLDA1 /PDRR0WE /PDRR1WE /PDRR2WE
/PDRR3WE /READ /SYNCWR VCC
```

EQUATIONS

PDRR3WE

| | | |
|---|---|---|
| := | /DOSRST*/HOLDA1*DRPHASE2*ADS*/MIO*/CODE *\/READ*BBE3 | ; CPU |
| + | /DOSRST*HOLDA1*DRPHASE2*SYNCWR*BBE3 | ; DMA |
| + | PDRR3WE*/DRPHASE2 | ; HOLD |

PDRR2WE

| | | |
|---|---|---|
| := | /DOSRST*/HOLDA1*DRPHASE2*ADS*/MIO*/CODE *\/READ*BBE2 | ; CPU |
| + | /DOSRST*HOLDA1*DRPHASE2*SYNCWR*BBE2 | ; DMA |
| + | PDRR2WE*/DRPHASE2 | ; HOLD |

PDRR1WE

| | | |
|---|---|---|
| := | /DOSRST*/HOLDA1*DRPHASE2*ADS*/MIO*/CODE *\/READ*BBE1 | ; CPU |
| + | /DOSRST*HOLDA1*DRPHASE2*SYNCWR*BBE1 | ; DMA |
| + | PDRR1WE*/DRPHASE2 | ; HOLD |

PDRR0WE

| | | |
|---|---|---|
| := | /DOSRST*/HOLDA1*DRPHASE2*ADS*/MIO*/CODE *\/READ*BBE0 | ; CPU |
| + | /DOSRST*HOLDA1*DRPHASE2*SYNCWR*BBE0 | ; DMA |
| + | PDRR0WE*/DRPHASE2 | ; HOLD |

PAL DOSREAD (402)

DESCRIPTION :

This pal generates the output enables for the DOSSRAM card.

ROW0 OE decodes modulo 0-256K. ROW1 OE decodes modulo 256K-512K.

ROW2 OE decodes modulo 512K-576K. ROW3 OE decodes modulo 576K-640K.

The DOSSRAM rows are only Chip Enabled for exact decodes to their space.

The OEs stay active until READY is issued to the processor.

DRCLK A19 A18 A17 A16 /ADS /DRPHASE2 /MIO /DOSRST GND
/BDOSRAMEN /DRREADY /HOLDA1 /PDRR0OE /PDRR1OE /PDRR2OE
/PDRR3OE /READ /SYNCRD VCC

EQUATIONS

PDRR3OE

```
:=  /DOSRST*/HOLDA1*DRPHASE2*ADS*/MIO       ; CPU/576-640
    *READ*A19*/A18*/A17*A16

+  /DOSRST*HOLDA1*DRPHASE2*SYNCRD           ; DMA/576-640
    *A19*/A18*/A17*A16

+  PDRR3OE*/DRPHASE2                        ; HOLD

+  /DOSRST*PDRR3OE*/HOLDA1*DRPHASE2*/DRREADY; HOLD
```

PDRR2OE

```
:=  /DOSRST*/HOLDA1*DRPHASE2*ADS*/MIO       ; CPU/512-576
    *READ*A19*/A18*/A17*/A16

+  /DOSRST*HOLDA1*DRPHASE2*SYNCRD           ; DMA/512-576
    *A19*/A18*/A17*/A16

+  PDRR2OE*/DRPHASE2                        ; HOLD

+  /DOSRST*PDRR2OE*/HOLDA1*DRPHASE2*/DRREADY; HOLD
```

PDRR1OE

```
:=  /DOSRST*/HOLDA1*DRPHASE2*ADS*/MIO       ; CPU/256-512
    *READ*/A19*A18

+  /DOSRST*HOLDA1*DRPHASE2*SYNCRD           ; DMA/256-512
    */A19*A18
```

+ PDRR1OE*/DRPHASE2                                  ; HOLD

+ /DOSRST*PDRR1OE*/HOLDA1*DRPHASE2*/DRREADY; HOLD

PDRR0OE

:= /DOSRST*/HOLDA1*DRPHASE2*ADS*/MIO        ; CPU/0-256
   *READ*/A19*/A18

+ /DOSRST*HOLDA1*DRPHASE2*SYNCRD             ; DMA/0-256
  */A19*/A18

+ PDRR0OE*/DRPHASE2                                  ; HOLD

+ /DOSRST*PDRR0OE*/HOLDA1*DRPHASE2*/DRREADY; HOLD

PAL ROW3DEC (1401)

DESCRIPTION :

This pal decodes the space for ROW3 on the MEMORY CARD.

EMA23 EMA22 EMA21 A20 /1MR3 /1MR2 /1MR1 /1MR0 /ENR3 GND
/ENR2 /ROW3A /ENR1 /ENR0 /ROW3B /ROW3C /DOSRAMEN /LO16MEG
/ROW3D VCC

EQUATIONS

ROW3A is enabled when there is no DOSSRAM CARD; ROW 0,1, and 2 have 256K SIMMs, and ROW 3 is enabled.

ROW3A.TRST

= ENR0*/1MR0*ENR1*/1MR1*ENR2*/1MR2*ENR3*/DOSRAMEN

ROW3A

= LO16MEG*/EMA23*/EMA22* EMA21* A20                  ;3M-4M

+ 1MR3*LO16MEG*/EMA23* EMA22*/EMA21                  ;4M-6M

+ 1MR3*LO16MEG*/EMA23* EMA22* EMA21*/A20             ;6M-7M

ROW3B is enabled when there is no DOSSRAM CARD; ROW 2 has 1M SIMMs, and ROW 3 has 1M SIMMs.

ROW3B.TRST

= ENR0*ENR1*ENR2*1MR2*ENR3*1MR3*/DOSRAMEN

ROW3B

= /1MR0*/1MR1*LO16MEG*/EMA23* EMA22* EMA21           ;6M-8M

| | |
|---|---|
| + /1MR0*/1MR1*LO16MEG* EMA23*/EMA22*/EMA21 | ;8M-10M |
| + /1MR0* 1MR1*LO16MEG* EMA23*/EMA22*/EMA21* A20 | ;9M-10M |
| + /1MR0* 1MR1*LO16MEG* EMA23*/EMA22* EMA21 | ;10M-12M |
| + /1MR0* 1MR1*LO16MEG* EMA23* EMA22*/EMA21*/A20 | ;12M-13M |
| + 1MR0* 1MR1*LO16MEG* EMA23* EMA22 | ;12M-16M |

ROW3C is enabled when there is a DOSSRAM CARD; ROW 0, 1, and 2 have 256K SIMMs, and ROW 3 is enabled.

ROW3C.TRST

= ENR0*/1MR0*ENR1*/1MR1*ENR2*/1MR2*ENR3*DOSRAMEN

ROW3C

| | |
|---|---|
| = /1MR3*LO16MEG*/EMA23* EMA22*/EMA21*/A20 | ;4M-5M |
| + 1MR3*LO16MEG*/EMA23* EMA22 | ;4M-8M |

ROW3D is enabled when there is a DOSSRAM CARD; ROW 2 has 1M SIMMs, and ROW 3 has 1M SIMMs.

ROW3D.TRST

= ENR0*ENR1*ENR2*1MR2*ENR3*1MR3*DOSRAMEN

ROW3D

| | |
|---|---|
| = /1MR0*/1MR1*LO16MEG*/EMA23* EMA22* EMA21*A20 | ;7M-8M |
| + /1MR0*/1MR1*LO16MEG* EMA23*/EMA22*/EMA21 | ;8M-10M |
| + /1MR0*/1MR1*LO16MEG* EMA23*/EMA22* EMA21*/A20 | ;10M-11M |
| + /1MR0* 1MR1*LO16MEG* EMA23*/EMA22* EMA21 | ;10M-12M |
| + /1MR0* 1MR1*LO16MEG* EMA23* EMA22*/EMA21 | ;12M-14M |
| + 1MR0* 1MR1*LO16MEG* EMA23* EMA22*/EMA21*A20 | ;13M-14M |
| + 1MR0* 1MR1*LO16MEG* EMA23* EMA22* EMA21 | ;14M-16M |

PAL ROW12DEC (1402)

DESCRIPTION :

This pal decodes the space for ROW1 and ROW2 on the MEMORY card.

EMA23 EMA22 EMA21 A20 /1MR2 /1MR1 /1MR0 /ENR2 /ENR1 GND
/ENR0 /ROW1A /ROW1B /DOSRAMEN /LO16MEG /IO16 /ROW2A
/ROW2B /ROW2C VCC

EQUATIONS

ROW1A is enabled if there is no DOSSRAM card, and ROW1 is enabled.

ROW1A.TRST

= ENR1*ENR0*/DOSRAMEN

ROW1A

| | |
|---|---|
| = /1MR0*LO16MEG*/EMA23*/EMA22*/EMA21*A20 | ;1M-2M |
| + /1MR0*1MR1 *LO16MEG*/EMA23*/EMA22*EMA21 | ;2M-4M |
| + /1MR0*1MR1 *LO16MEG*/EMA23*EMA22*/EMA21*/A20 | ;4M-5M |
| + 1MR0*1MR1*LO16MEG*/EMA23*EMA22 | ;4M-8M |

ROW1B is enabled if there is a DOSSRAM card, and ROWS 0 & 1 are enabled.

ROW1B.TRST

= ENR1*ENR0*DOSRAMEN

ROW1B

| | |
|---|---|
| = /1MR0*LO16MEG*/EMA23*/EMA22*EMA21*/A20 | ;2M-3M |
| + /1MR0*1MR1 *LO16MEG*/EMA23*/EMA22*EMA21 | ;2M-4M |
| + /1MR0*1MR1 *LO16MEG*/EMA23*EMA22*/EMA21 | ;4M-6M |
| + 1MR0*1MR1 *LO16MEG*/EMA23*EMA22*/EMA21*A20 | ;5M-6M |
| + 1MR0*1MR1 *LO16MEG*/EMA23*EMA22*EMA21 | ;6M-8M |
| + 1MR0*1MR1 *LO16MEG*EMA23*/EMA22*/EMA21*/A20 | ;8M-9M |

ROW2A is enabled if there is no DOSSRAM card, and ROW2 is enabled.

ROW2A.TRST

= ENR0*ENR1*ENR2*/DOSRAMEN

ROW2A

| | |
|---|---|
| = /1MR0*/1MR1*/1MR2<br>  *LO16MEG*/EMA23*/EMA22*EMA21*/A20 | ;2M-3M |
| +. /1MR0*/1MR1*1MR2<br>  *LO16MEG*/EMA23*/EMA22*EMA21 | ;2M-4M |
| + /1MR0*/1MR1*1MR2<br>  *LO16MEG*/EMA23*EMA22*/EMA21 | ;4M-6M |
| + /1MR0*1MR1*1MR2<br>  *LO16MEG*/EMA23*EMA22*/EMA21*A20 | ;5M-6M |
| + /1MR0*1MR1*1MR2<br>  *LO16MEG*/EMA23*EMA22*EMA21 | ;6M-8M |
| + /1MR0*1MR1*1MR2<br>  *LO16MEG*EMA23*/EMA22*/EMA21*/A20 | ;8M-9M |
| + 1MR0*1MR1*1MR2<br>  *LO16MEG*EMA23*/EMA22 | ;8M-12M |

ROW2B is enabled if there is a DOSSRAM card, ROW 0 has 256K SIMMs, and ROW2 is enabled.

ROW2B.TRST

= ENR0*/1MR0*ENR1*ENR2*DOSRAMEN

ROW2B

| | |
|---|---|
| = LO16MEG*/EMA23*/EMA22* EMA21* A20*/1MR1 | ;3M-4M |
| + 1MR2*LO16MEG*/EMA23* EMA22*/EMA21*/1MR1 | ;4M-6M |
| + 1MR2*LO16MEG*/EMA23* EMA22* EMA21*/A20*/1MR1 | ;6M-7M |
| + LO16MEG*/EMA23* EMA22* EMA21*/A20* 1MR1 | ;6M |
| + 1MR2*LO16MEG*/EMA23* EMA22* EMA21*1MR1 | ;6-8M |
| + 1MR2*LO16MEG* EMA23*/EMA22*/EMA21*1MR1 | ;8-10M |

ROW2C is enabled if there is a DOSSRAM card, and ROWS 0,1 and 2 have 1M SIMMs.

ROW2C.TRST

= ENR0*1MR0*ENR1*1MR1*ENR2*1MR2*DOSRAMEN

ROW2C

= EMA23*/EMA22*/EMA21*A20*LO16MEG                    ;9M-10M

+ EMA23*/EMA22*EMA21*LO16MEG                         ;10M-12M

+ EMA23*EMA22*/EMA21*/A20*LO16MEG                    ;12M-13M

PAL ROW0DEC (1403)

DESCRIPTION :

This pal decodes the space for ROW0 on the MEMORY card. RELOC signals the memory control that the cycle is a relocation cycle, so that it will select the ADDRESS MUX properly.

EMA23 EMA22 EMA21 A20 EMA19 EMA18 EMA17 /1MR1 /1MR0 GND
/ENR1 /RELOC /ENR0 /RELOCOK /512ONLY /DOSRAMEN /LO16MEG
/ROW0A /ROW0B VCC

EQUATIONS

ROW0A is enabled when ROW 0 has 256K SIMMs

ROW0A.TRST

= ENR0*/1MR0

ROW0A

= /DOSRAMEN*LO16MEG
  */EMA23*/EMA22*/EMA21*/A20*/EMA19              ;0-512K    no DR

+ /DOSRAMEN*/512ONLY*LO16MEG*/EMA23*/EMA22
  */EMA21*/A20*EMA19*/EMA18*/EMA17               ;512K-640K no DR

+ /DOSRAMEN*RELOCOK*/ENR1*LO16MEG
  */EMA23*/EMA22*/EMA21*A20*/EMA19*/EMA18        ;1M+256K        "

+ /DOSRAMEN*RELOCOK*/ENR1*LO16MEG
   */EMA23*/EMA22*/EMA21*A20*/EMA19*EMA18*/EMA256M+128K "

+ /DOSRAMEN*RELOCOK*ENR1*/1MR1*LO16MEG
  */EMA23*/EMA22*EMA21*/A20*/EMA19*/EMA18        ;2M+256K        "

+ /DOSRAMEN*RELOCOK*ENR1*/1MR1*LO16MEG
   */EMA23*/EMA22*EMA21*/A20*/EMA19*EMA18*/EMA17
                                                 ;1.256M+128K   "

+ DOSRAMEN*LO16MEG
  */EMA23*/EMA22*/EMA21*A20                      ;1M-2M     w/ DR

ROW0B is enabled when ROW 0 has 1M SIMMs

ROW0B.TRST

= ENR0*1MR0

ROW0B

= /DOSRAMEN*LO16MEG
  */EMA23*/EMA22*/EMA21*/A20*/EMA19              ;0-512K  no D

+ /DOSRAMEN*/512ONLY*LO16MEG
  */EMA23*/EMA22*/EMA21*/A20*EMA19*/EMA18*/EMA17
                                                 ;512K-640K  "

+ LO16MEG*/EMA23*/EMA22*/EMA21*A20               ;1M-2M  always

+ LO16MEG*/EMA23*/EMA22*EMA21                    ;2M-4M  always

+ DOSRAMEN*LO16MEG*/EMA23*EMA22*/EMA21*/A20      ;4M-5M  w/DR

RELOC

= /DOSRAMEN*RELOCOK*/ENR1*LO16MEG
  */EMA23*/EMA22*/EMA21*A20*/EMA19*/EMA18        ;1M+256K

+ /DOSRAMEN*RELOCOK*/ENR1*LO16MEG
  /EMA23*/EMA22*/EMA21*A20*/EMA19*EMA18*/EMA17
                                                 ;1.256M+128K

+ /DOSRAMEN*RELOCOK*ENR1*/1MR1*LO16MEG
  */EMA23*/EMA22*EMA21*/A20*/EMA19*/EMA18        ;2M+256K

+ /DOSRAMEN*RELOCOK*ENR1*/1MR1*LO16MEG
  */EMA23*/EMA22*EMA21*/A20*/EMA19*EMA18*/EMA17
                                                 ;2.256M+128K wherein said second memory storage unit includes at least 640K of high speed static random access memories.

3. The device of claim 1, wherein the sequential ordering of said first memory storage unit begins at a one-millionth address in response to a presence of said second memory storage unit.

4. The device of claim 1, wherein said operating system is a disk operating system.

5. The device of claim 1, further comprising:
a cache memory having sequentially ordered addresses after sequentially ordered addresses of said second memory storage unit.

6. The device of claim 1, further comprising:
a video read only memory having addresses sequentially ordered immediately after a last address of said second memory storage unit.

7. A method of optimizing performance of a memory system comprising the steps of:
ascertaining a presence of a fixed memory and a separate other memory, wherein said separate other memory has a faster operating speed than said fixed memory;
addressing said fixed memory in sequential address order beginning with address number one when said separate other memory is not present;
addressing said ascertained separate other memory sequentially beginning with address number one such that an operating system is placed in faster separate other memory instead of slower fixed memory for optimization of said operating system; and
addressing said fixed memory sequentially beginning with an address greater than the last address of said ascertained separate other memory.

8. The method set forth in claim 7, wherein said fixed memory is dynamic random access memory corresponding to operating system extended memory; and wherein said
ascertained separate other memory is high speed static random access memory corresponding to operating system real memory where an operating system and its applications reside.

9. The method of claim 8, wherein said operating system is a disk operating system.

10. The method of claim 8, further comprising the step of:
addressing a video read only memory in sequential address order immediately following said separate other memory and before said fixed memory.

11. The method of claim 10, further comprising the step of:

addressing a cache memory in sequential order after said video read only memory.

12. The method of claim 7, wherein said fixed memory is addressed beginning with the one-millionth address.

13. A high speed memory system for use with a digital computer comprising:
sequentially addressable dynamic random access memory;
640K of high speed sequentially addressable static random access memory for storing an operating system and its applications;
means for determining when said high speed memory is installed in said computer;
means for addressing said high speed memory, when present, beginning with said computer's first memory address;
means for addressing said dynamic random access memory, when said high speed memory is present, beginning with said computer's one-millionth address; and
means for addressing said computer's dynamic random access memory, when said high speed memory is not present, beginning with said computer's first memory address.

14. The memory system of claim 13, wherein said operating system is a disk operating system.

15. The memory system of claim 13, wherein said determining means includes generating a signal in response to a presence of said high speed memory.

16. The memory system of claim 15, wherein said signal activates said addressing means such that address number one of the computer is within said high speed memory.

17. The memory system of claim 16, further comprising:
a cache memory having addresses sequentially ordered after sequentially ordered addresses of said high speed memory.

18. The memory system of claim 17, further comprising:
a video read only memory having addresses sequentially ordered immediately following a last address of said high speed memory.

19. The memory system of claim 18, wherein said video read only memory includes 384K of address space such that said dynamic random access memory is sequentially addressed beginning with said computer's one-millionth address.

* * * * *